United States Patent
Yoneyama et al.

(10) Patent No.: US 6,587,149 B1
(45) Date of Patent: Jul. 1, 2003

(54) VIDEO CAMERA WITH PROGRESSIVE SCANNING AND DYNAMIC RANGE ENLARGING MODES

(75) Inventors: Masayuki Yoneyama, Takatsuki (JP); Yasutoshi Yamamoto, Hirakata (JP); Masaaki Nakayama, Hirakata (JP); Kohichi Toyomura, Kitano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/174,254

(22) Filed: Oct. 16, 1998

(30) Foreign Application Priority Data

Oct. 17, 1997 (JP) .............................. 9-285193
Sep. 17, 1998 (JP) ........................... 10-262584

(51) Int. Cl.$^7$ .......................... H04N 5/235; G03B 7/00
(52) U.S. Cl. ................... 348/362; 348/229.1; 348/230.1
(58) Field of Search ................................ 348/362, 229, 348/230

(56) References Cited

U.S. PATENT DOCUMENTS

| | | | |
|---|---|---|---|
| 5,517,242 A | 5/1996 | Yamada et al. | |
| 5,638,119 A | 6/1997 | Cornuejols | |
| 6,219,097 B1 * | 4/2001 | Kamishima et al. | 348/297 |
| 6,248,133 B1 * | 6/2001 | Komobuchi et al. | 348/315 |
| 6,278,490 B1 * | 8/2001 | Fukuda et al. | 348/362 |

FOREIGN PATENT DOCUMENTS

| | | | |
|---|---|---|---|
| EP | 0599200 | 6/1994 | H04N/3/15 |
| EP | 0743787 | 11/1996 | H04N/5/235 |
| FR | 2660822 | 10/1991 | H04N/5/235 |
| JP | 06113207 | 4/1994 | H04N/5/335 |
| JP | 07095481 | 4/1995 | H04N/5/335 |

* cited by examiner

*Primary Examiner*—Andrew Christensen
*Assistant Examiner*—Tia M. Harris
(74) *Attorney, Agent, or Firm*—Wenderoth, Lind & Ponack L.L.P.

(57) ABSTRACT

A video camera which comprises a progressive scanning CCD, a camera signal processing part for converting an output from the progressive scanning CCD to a video signal adaptive to video display, and a driving means for driving the progressive scanning CCD, and which enables to enlarge dynamic range by synthesizing a first signal obtained by exposure during a first predetermined time and a second signal obtained by exposure during a predetermined time after the exposure time of the first signal by means of the progressive scanning CCD to enlarge luminance gradation characteristics on appearance further includes at least a separating portion for separating the first signal and the second signal which are output from the progressive scanning CCD at different timings, a signal synthesizing portion for synthesizing the first signal and the second signal to produce a synthesized signal, and a delay portion for receiving the first signal output from the separating portion and for delaying the first signal by a predetermined time so that the second signal and the first signal are simultaneously input to the signal synthesizing portion.

26 Claims, 16 Drawing Sheets

VIDEO CAMERA WITH PROGRESSIVE SCANNING AND DYNAMIC RANGE ENLARGING MODES

FIELD OF THE INVENTION

The present invention relates to a video camera and, more particularly, to a video camera that can perform enlargement of dynamic range of such as a video movie, successive picturing of frame still images, and enlargement of dynamic range of frame still images.

DESCRIPTION OF PRIOR ART

Operation of Prior Art

As a method for enlarging the dynamic range of a video camera, there is a method which is described in Japanese Published Patent Application No. Hei 6-13207. In this method, a first exposure signal such as a long term exposure signal (hereinafter, "Slong signal") and a second exposure signal such as a short term exposure signal (hereinafter, "Sshort signal") are synthesized, thereby enlarging the dynamic range on appearance.

This method will be briefly described with reference to the drawings.

FIG. 17 is a block diagram illustrating an example of construction of a prior art video camera 6. FIG. 18 is a diagram schematically showing the storage state and transferring state of Slong signals and Sshort signals which are light-electricity converted by a progressive scanning CCD 11 in the prior art video camera.

This video camera 6 is constituted by a taking lens 10, a progressive scanning CCD 11, a switch 12, a signal synthesizing means 18, and a camera signal processing part 20.

In addition, the progressive scanning CCD 11 is constituted by light-electricity conversion parts 50, vertical transfer parts 52 transferring charges in the vertical direction, which charges are transferred from the light-electricity conversion parts 50, a horizontal transfer part 54 which outputs serially in the horizontal direction the charges which are transferred from the vertical transfer parts 52, and an output amplifier 56 which amplifies output of the horizontal transfer part 54.

The light-electricity conversion part 50 comprises photodiodes 51, the number of which corresponds to the pixel number, and the vertical transfer part 52 comprises a plurality of CCD 53 which are respectively vertically arranged respectively corresponding to the photodiode 51.

While in FIG. 18 an array which has 4 rows of pixels and 6 columns of pixels is illustrated, in an actual construction of such as VGA (Video Graphics Array), a construction which has 640 rows of pixels and 480 columns of pixels is adopted.

In the video camera 6 constructed as above, the light incident to the video camera through the taking lens 10 is light-electricity converted in the progressive scanning CCD 11.

In other words, in this progressive scanning CCD 11, as shown in FIG. 19, in the period of one field, i.e., the vertical scanning period (hereinafter also referred to as "1V"), the exposure time is switched between the long exposure time T1' and the short exposure time T2' by means of an electronic shutter (not shown here) so that the exposure amount against the light-electricity conversion part 50 in the progressive scanning CCD 11 may be different.

Here, T1' is set to about 1/60 second, and T2' is set to about 1/1000 second. Video images of one screen are respectively imaged during T1' and T2', thereby outputting a signal to the vertical transfer part 52 at the timing shown in FIG. 19. The signal read out during T1' becomes a Slong signal and the signal read out during T2' becomes a Sshort signal.

The Slong signals and the Sshort signals which are obtained with light-electricity converted by the respective photodiodes 51 of the light-electricity conversion part 50 are read out to the vertical transfer part 52 as shown by arrows in the figure so that outputs from the upper and lower photodiodes 51 which are adjacent each other are added respectively, in a vertical blanking period (in this case during T1'–T2'). Therefore, in the vertical transfer part 52, the Slong signal and the Sshort signal are respectively stored at the position of CCD 53 designated by a black circle and at the position of CCD 53 designated by a white circle, alternatingly.

Therefore, the respective Slong signal and Sshort signal stored in the vertical transfer part 52 are transferred alternatingly to the horizontal transfer part 54 by line by line, and thereby they are output from the light-electricity conversion part 50 through the output amplifier 56. Accordingly, when, for example, the progressive scanning CCD 11 comprises 480 pixels in the vertical direction, Slong signals of 240 lines and Sshort signals of 240 lines are respectively output from the light-electricity conversion part 50 in the period of one field, i.e., 1V.

After the Slong signal and the Sshort signal, which are serially output line by line from the progressive scanning CCD 11, are separated into the Slong signal and the Sshort signal by the switch 12, these signals are synthesized in the signal synthesizing means 18 to be output to the camera signal processing part 20 as a signal of one series. Accordingly, in the case of non-interlacing system, the above example results in synthesized signals of 240 lines (hereinafter, "Smix signal") in the period of one field, i.e., 1V.

Here, while as shown in FIG. 20 the above Slong signal is saturated at the light incident amount of L1' due to the large exposure amount, this Slong signal has a large change of signal level at the light incident amount below that, thereby resulting in a preferred S/N ratio and keeps the gradation at the low luminescent part.

On the other hand, while the Sshort signal has low gradation at the low luminescent part due to the low exposure amount, it keeps the gradation without saturating up to the high luminescent part on the contrary. Therefore, the gradation characteristics of the Smix signal, which has synthesized the both, is enlarged relative to the gradation characteristics of the Slong signal only, and thus, the dynamic range on appearance is enlarged.

In this way, the Smix signal whose dynamic range is thus enlarged by the signal synthesizing means 18 is processed to a video signal which is adaptive to the television display (such as NTSC system) by the camera signal processing means 20, and is output to the outside.

PROBLEMS TO BE SOLVED

However, the above-described prior art video camera 6 has the following problems.

First of all, since in the prior art video camera 6 T1' is set to 1/60 sec. and T2' is set to 1/1000 sec. as described above, the enlargement rate ($\theta 1'/\theta s'$) of dynamic range in this case is about 16 times [≈(1/60)/(1/1000)].

However, when T2' is quite a short time, such as when T2' is 1/1000 sec., not only the S/N ratio of the Sshort signal itself is insufficient but also the gradation of the video image imaged by the video camera 6 becomes insufficient as well.

In other words, in case where such enlargement rate of dynamic range amounts to about 16, and when the scenery inside the room and that outside as shown in FIG. 21 are imaged together, while the video images of the clear part 72 (scenery outside) and of the dark part 71 (inside the room) are obtained as clear ones, the video images of the intermediate part 73 (periphery of a window, such as a desk adjacent to the window) for which the enlargement rate of dynamic range of about 2~4 times is made the most appropriate cannot be made clear images due to the too large enlargement rate of dynamic range in the prior art device, thereby resulting in a large problem.

With reference to FIG. 20, this problem is explained as a fact that when the light incident amount is within a range of L1' to L2', since the signal level of the Sshort signal at that timing is low while the Slong signal is saturated, the S/N ratio is deteriorated, whereby the Smix signal is affected by noise components to result in non-preferred video images.

In the above-described prior art video camera 6, when the progressive scanning CCD 11 is used for enlargement of dynamic range, it is not possible to accomplish the inherent object as the progressive scanning CCD 11 itself, i.e., to obtain the progressive scanning output, particularly, the output that has enhanced the picture quality by vertical high frequency emphasizing.

More particularly, though in the above-described video camera 6 it is intended that Slong signals of 240 lines and Sshort signals of 240 lines are respectively output from the progressive scanning CCD 11 in the period of one field, the both signals are synthesized by the signal synthesizing means 18, resulting in only Smix signals of 240 lines. Therefore, it was not possible to utilize the video camera in case where high quality video image of 480 lines should be printed out by non-interlacing system, for example.

It is an object of the present invention to provide a video camera in which the practical enlargement rate of dynamic range, such as two times to four times, can be obtained, and further the progressive scanning CCD can be used for the enlargement of dynamic range and progressive scanning output.

SUMMARY OF THE INVENTION

To solve the above problem, a video camera comprising a progressive scanning CCD, a driving means for driving the progressive scanning CCD, and a camera signal processing part for converting an output of the progressive scanning CCD to a video signal adaptive to a video image display, and enabling enlarging dynamic range by synthesizing a first signal which is obtained by exposure during a first predetermined time and a second signal which is obtained by exposure during a predetermined time after the exposure time of the first signal, by means of the progressive scanning CCD and enlarging luminance gradation characteristics on appearance, which further comprises a separating means for separating the first signal and the second signal which are output from the progressive scanning CCD at different timings, a signal synthesizing means for synthesizing the first signal and the second signal to produce a synthesized signal, and a delay means for receiving the first signal output from the separating means and delaying the first signal by a predetermined time so that the second signal and the first signal are simultaneously input to the signal synthesizing means.

A video camera comprising a progressive scanning CCD, and a camera signal processing part for converting an output from the progressive scanning CCD to a video signal adaptive to video image display, and enabling enlarging dynamic range by synthesizing a first signal which is obtained by exposure during a first predetermined time and a second signal which is obtained by exposure during a second predetermined time after the exposure time of the first signal, by means of the progressive scanning CCD to enlarge luminance gradation characteristics on appearance, which further comprises the progressive scanning CCD enabling outputting the first signal and the second signal at different timings, a signal separating switch for separating the first signal and the second signal which are output from the progressive scanning CCD, a delay means for delaying an output from the signal separating switch by one horizontal scanning period, a first memory for temporarily storing an output from the delay means, a second memory for temporarily storing the second signal which is output from the signal separating switch, a first scanning conversion means for converting an output from the first memory to a normal speed signal, a second scanning conversion means for converting an output from the second memory to a normal speed signal, and a synthesizing means for synthesizing the first signal and the second signal, synchronized and having normal speeds, which are output from the first scanning conversion means and the second scanning conversion means.

DETAILED DESCRIPTION OF THE PREFERRED EMBODIMENTS

First Embodiment

First of all, an example of a video camera according to the present invention which enables enlarging the dynamic range to about twice as well as appropriately switching the mode of progressive scanning CCD to a dynamic range enlarging mode or to a progressive scanning outputting mode, will be described with reference to the drawings as a first embodiment of the present invention.

Figure 1:
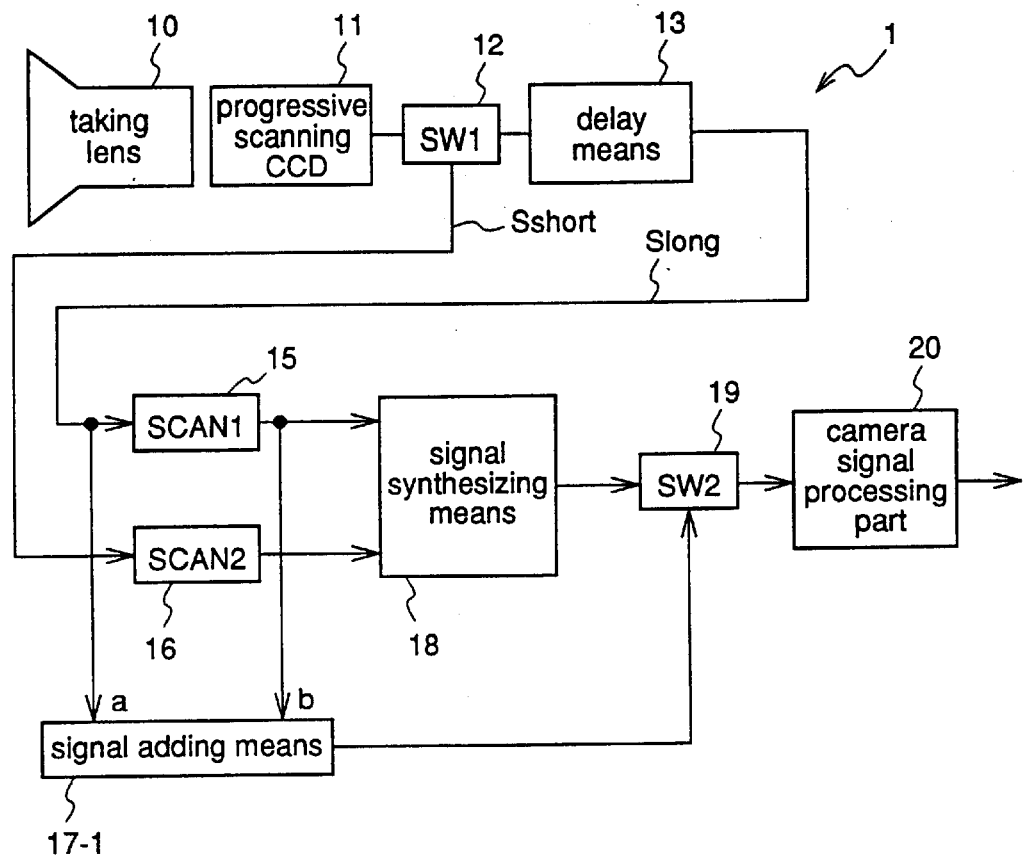
FIG. 1 is a block diagram illustrating a construction of a video camera according to a first embodiment of the present invention.
Figure 17:
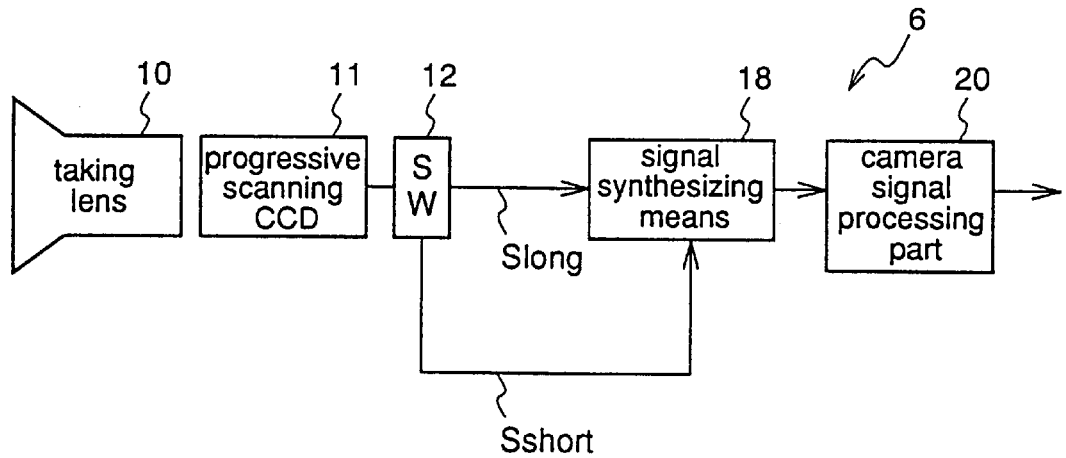
FIG. 17 is a block diagram illustrating a construction of a prior art video camera.

FIG. 1 is a block diagram illustrating a construction of a video camera 1 according to the first embodiment of the present invention. This video camera 1 performs the same operation as that of the prior art video camera 6 shown in FIG. 17, and the same reference numerals designate the same elements.

This video camera 1 is constituted by a taking lens 10, a progressive scanning CCD 11, a first switch 12, a delay means 13, a first scanning conversion means 15, a second scanning conversion means 16, a signal adding means 17-1, a signal synthesizing means 18, a second switch 19, and a camera signal processing part 20.

Here, the progressive scanning CCD 11 is supposed to be constituted with 480 pixels in the vertical direction for simplifying the understanding.

Figure 2:
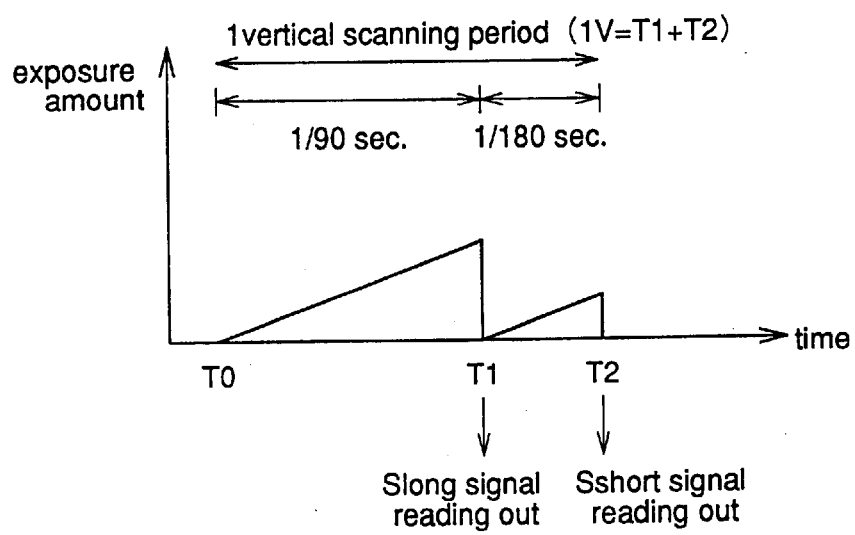
FIG. 2 is a timing diagram illustrating the signal output from a progressive scanning CCD of the video camera according to the first embodiment of the present invention.

In addition, in this progressive scanning CCD 11, when the mode in which the dynamic range of the output is enlarged (hereinafter, "dynamic range enlarging mode") is selected, as shown in FIG. 2, in the period of one field, i.e., the vertical scanning period (1V), the exposure time is switched between the long exposure time T1 as a first predetermined time and the short exposure time T2 as a second predetermined time by means of, for example, an electronic shutter (not shown here) so that the exposure amount against the light-electricity conversion part 50 in the progressive scanning CCD 22 may be different.

Here, T1 is set to about 1/90 sec. and T2 is set to about 1/180 sec. The signal read out at T1 is an Slong signal and the signal read out at T2 is an Sshort signal. In this embodiment, the exposure time T2 for obtaining the Sshort signal is sufficiently longer than that in the prior art video camera 6, i.e., T2>>T2'.

Figure 18:
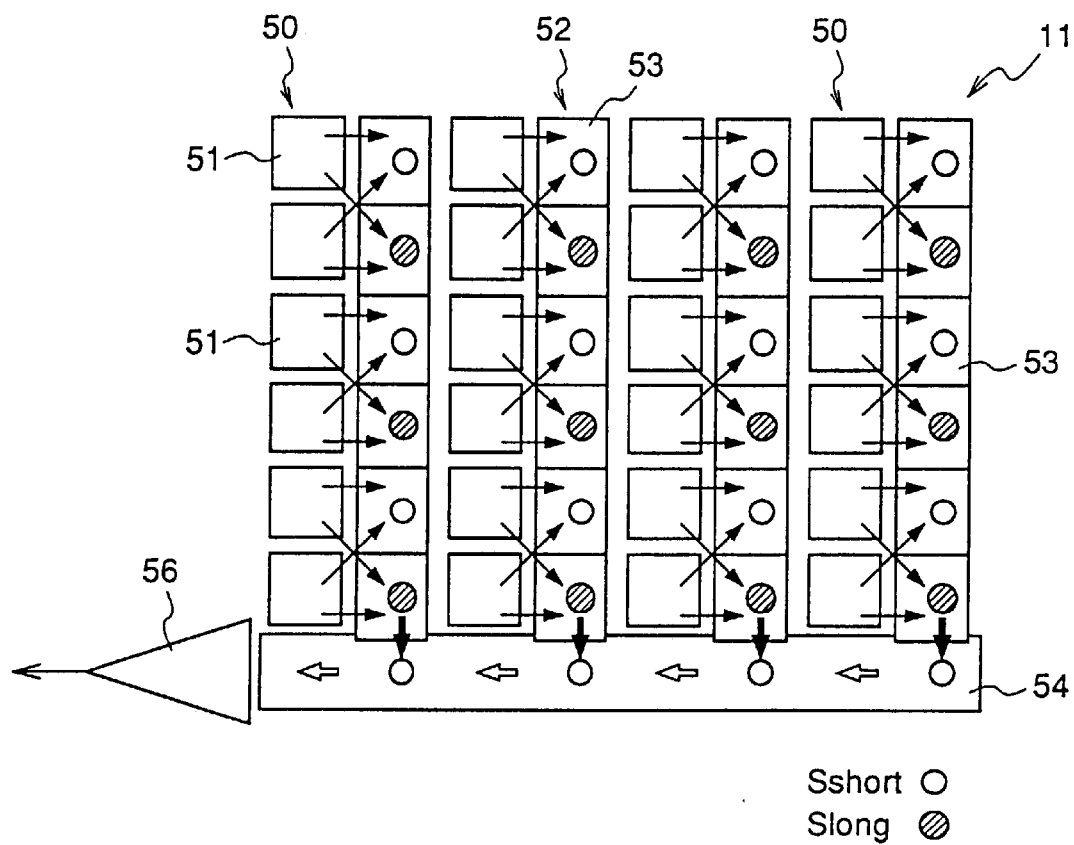
FIG. 18 is a schematic diagram illustrating the storage and transferring states of Slong signals and Sshort signals which are obtained with light-electricity converted by the progressive scanning CCD in the prior art video camera.
Figure 19:
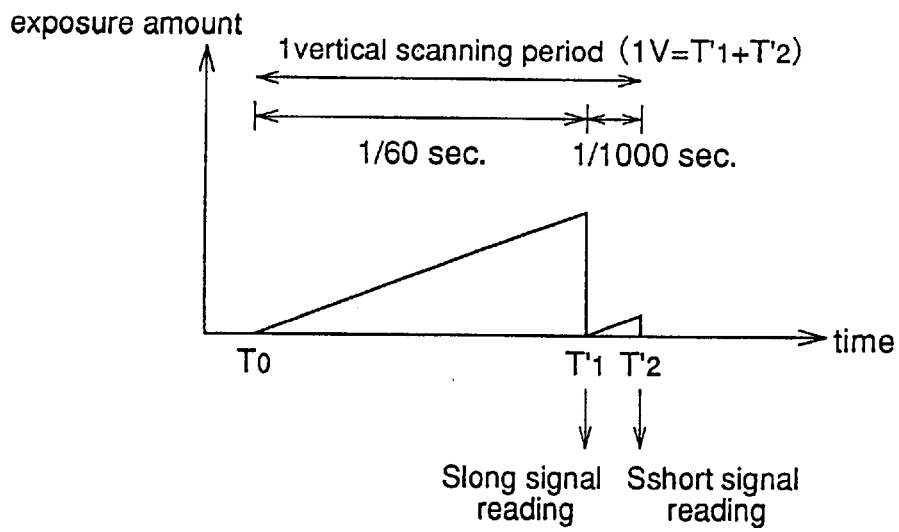
FIG. 19 is a diagram showing the timing of a signal output from the progressive scanning CCD of the prior art video camera.
Figure 20:
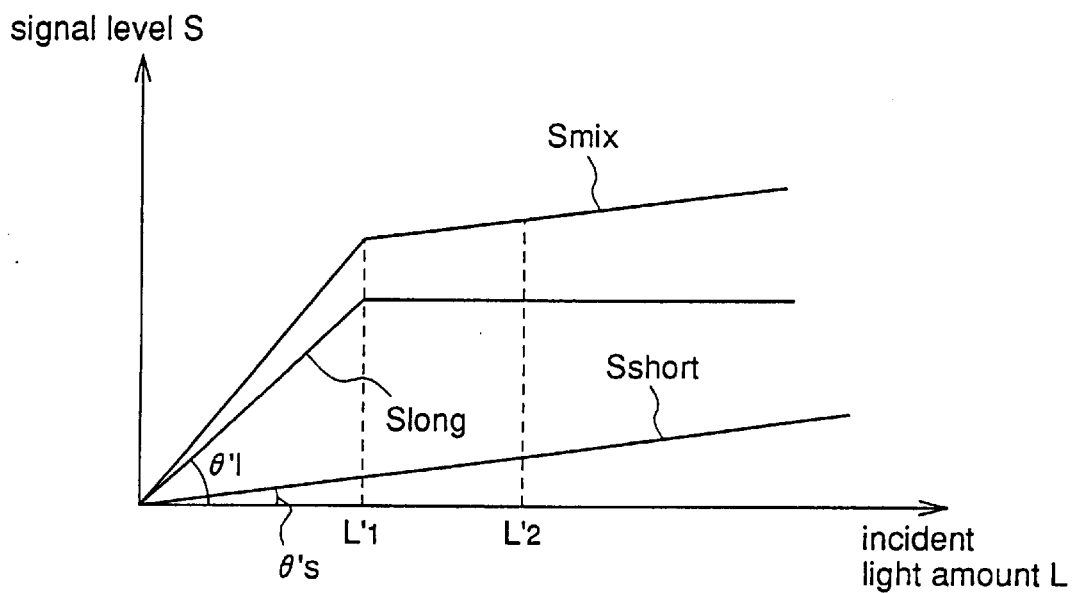
FIG. 20 is a characteristic diagram showing the relation between the Sshort signal, Slong signal, and Smix signal in the prior art video camera.
Figure 21:
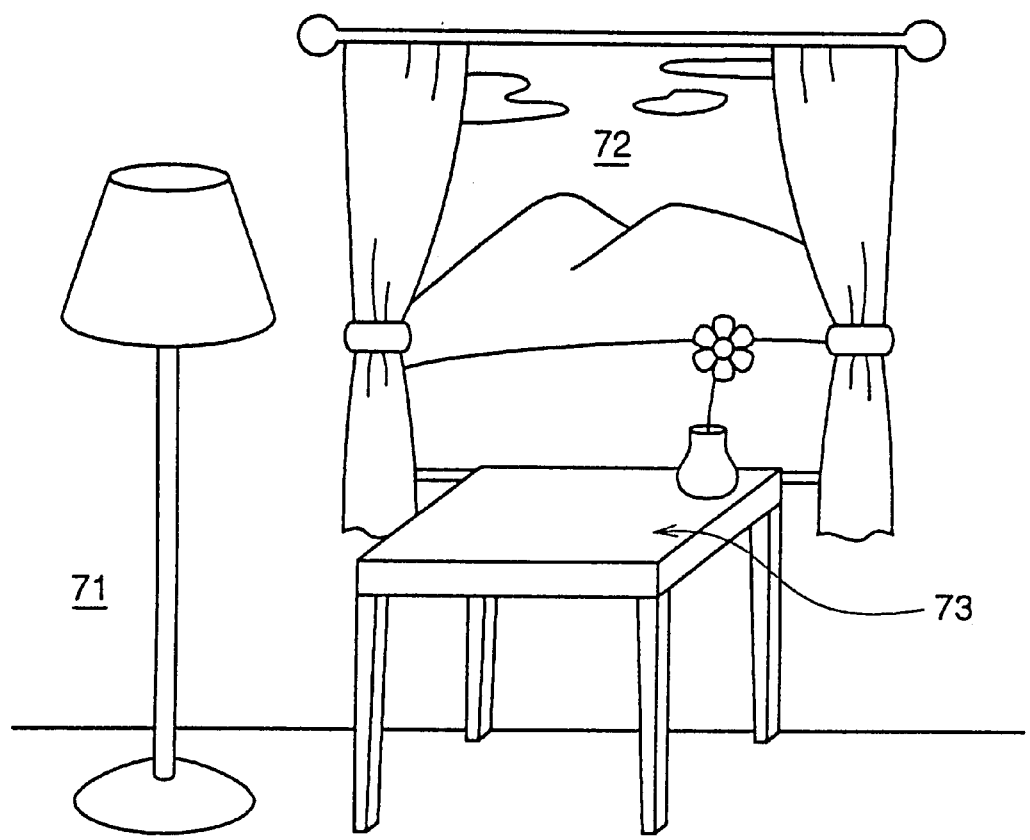
FIG. 21 is a diagram illustrating an example of scenery which is to be imaged by a video camera.

Further, when the dynamic range enlarging mode is selected in the progressive scanning CCD 11, similarly as in the case of the progressive scanning CCD 11 used in the prior art video camera 6 shown in FIG. 18, the Slong signals and the Sshort signals which are output from the upper and lower photodiodes 51 which are adjacent each other, of the light-electricity conversion part 50 are added at the respective CCDs 53 in the vertical transfer parts 52.

In this first embodiment, the values of T1 and T2 are not limited thereto, and can be appropriately set in accordance with the enlargement rate of dynamic range. In addition, in this first embodiment, the transfer operation in the horizontal transfer part 54 is temporarily stopped with the Slong signal is read out to the vertical transfer part 52 from the light-electricity conversion part 50.

Further, when the output of this progressive scanning CCD 11 is progressively scanned (hereinafter, referred to as "progressive scanning mode"), the exposure time is not switched but a video image of one screen is imaged in one field period (1V) by the light-electricity conversion part 50 to obtain the Slong signal, and this is read out to the CCDs 53 which correspond to the respective photodiodes 51.

Accordingly, the outputs of the respective upper and lower photodiodes 51 which are adjacent each other are not added as when the dynamic range of the output of the progressive scanning CCD 11 is enlarged (hereinafter, referred to as "dynamic range enlarging mode").

Therefore, when the progressive scanning mode is selected, the signal charges of the Slong signals of 480 lines are stored at the vertical transfer part 52.

The first switch 12 provides a separating means for selecting and separating the Slong signal and the Sshort signal which are output from the progressive scanning CCD 11 to output the same.

The first scanning conversion means 15 and the second scanning conversion means 16 perform adjustment such that each line of the Slong signal and the Sshort signal are output for the time corresponding to one horizontal scanning period (hereinafter, also referred to as "1H"), and these comprise dual port memories which can control the writing speed and the reading speed independently.

The first scanning conversion means 15 and the second scanning conversion means 16 are respectively controlled such that the reading speed is a half of the writing speed when the dynamic range enlarging mode is selected in the progressive scanning mode CCD 11, and the reading speed is equal to the writing speed when the progressive scanning mode is selected.

The signal synthesizing means 18 outputs a synthesized signal of one system, comprising an Slong signal and an Sshort signal synthesized with each other, i.e., an Smix signal.

The signal adding means 17-1 is used when the progressive scanning mode is selected in the progressive scanning CCD 11 and adds both Slong signals before and after the first scanning conversion means 15 together. This corresponds to adding the Slong signals of the pixels which are adjacent each other in the vertical direction.

The second switch 19 is switched such that is outputs the output of the signal synthesizing means 18 when the dynamic range enlarging mode is selected in the progressive scanning CCD 11 and it outputs the output of the signal adding means 17-1 when the progressive scanning mode is selected.

The operations of respective parts when the dynamic range enlarging mode is selected in the video camera 1 constituted as above, and when the progressive scanning mode is selected are described.

(1) when the dynamic range enlarging mode is selected

When this mode is selected, first of all, the light incident through the taking lens 10 is light-electricity converted in the progressive scanning CCD 11 to result in a Slong signal and a Sshort signal, thereby being output to the next stage.

On the other hand, in accordance with the controller which is not shown here, the output of the progressive scanning CCD 11 is switched by the second switch 19 so that the output of the signal synthesizing means 18 is selected.

In other words, in the progressive scanning CCD 11, as shown in FIG. 2, the exposure time is respectively switched to T1=$\frac{1}{60}$ sec. and T2=$\frac{1}{180}$ sec. in the period of one field (1V) and the video image of one screen is imaged during T1 and T2.

The Slong signals obtained by light-electricity conversion by the respective photodiodes 51 of the light-electricity conversion means 50 are read out to the vertical transfer part 52 at the end point of T1 shown in FIG. 2 and the outputs of the upper and lower photodiodes 51 which are adjacent each other are respectively added together. Next, the Sshort signals are similarly added at the end point of T2. Accordingly, the Slong signal and the Sshort signal are alternatingly stored in the vertical direction in the vertical transfer part 52.

The Slong signal and Sshort signal stored at the vertical transfer part 52 are respectively transferred to the horizontal transfer part 54 alternatively line by line, and output through the output amplifier 56.

Figure 3:
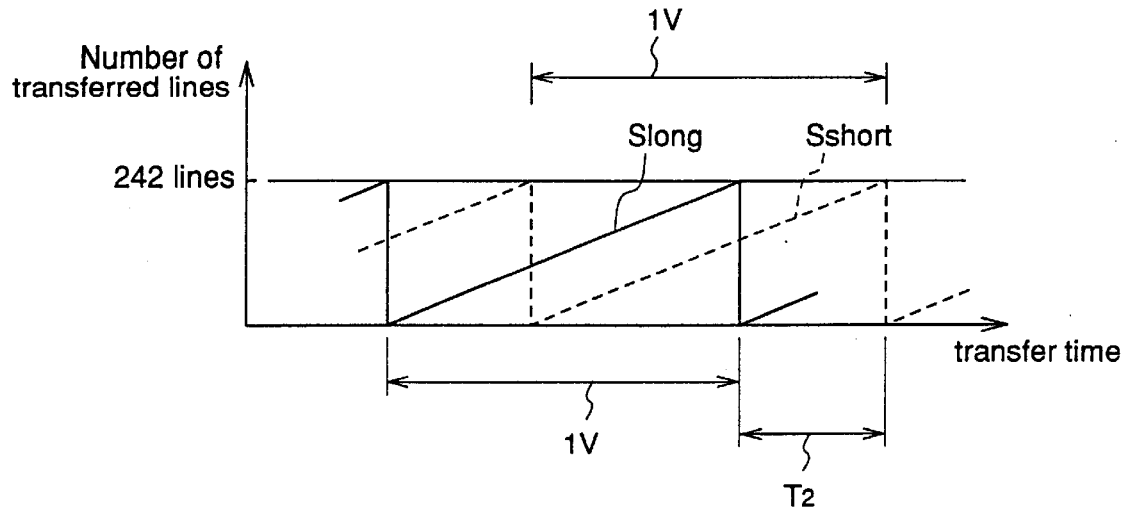
FIG. 3 is a diagram showing the signal transfer timing in the video camera according to the first embodiment of the present invention.

Accordingly, when the progressive scanning CCD 11 is constituted by 480 pixels in the vertical direction as in this embodiment, as shown in FIG. 3, the Slong signals of 240 lines and the Sshort signals of 240 lines are output in one field period (1V), and the output timings of the Slong signal and the Sshort signal are shifted by the exposure time T2 (=$\frac{1}{180}$ sec.).

When limited to the one field period, the Slong signal is output prior to the Sshort signal by T2.

The Slong signal and the Sshort signal which are thus serially output alternatingly line by line from the progressive scanning CCD 11 are separated by the first switch 12 from each other, and the Slong signal is input to the first scanning conversion means 15 after being delayed by T2 by the delay means 13, and the Sshort signal is input to the second scanning conversion means 16 as it is.

The Slong signal and the Sshort signal which are stored at the first scanning conversion means 15 and the second scanning conversion means 16 at one line unit, are read out at a reading out speed which is equal to a half of the writing speed so as to correspond to the one horizontal scanning period (1H) under the interlacing system, and are output to the next stage signal synthesizing means 18 to by synthesized to result in an Smix signal. Accordingly, in the case of interlacing system, the Smix signals of 240 lines in one vertical scanning period (1V) can be obtained.

Here, in this embodiment, T1 is set to $\frac{1}{60}$ sec. and T2 is set to $\frac{1}{180}$ sec. and the enlargement ratio of the dynamic range ($\theta 1/\theta s$) becomes twice [=($\frac{1}{60}$)/($\frac{1}{180}$)].

The Smix signal which is output from the signal synthesizing means 18 is given to the camera signal processing part 20 through the second switch 19, and a predetermined signal processing is applied thereto to be output.

In this way, the exposure time T2 for the Sshort signal is secured sufficiently longer than in the prior art and the S/N ratio of the Sshort signal itself is preferable and sufficient gradation is obtained.

Figure 4:
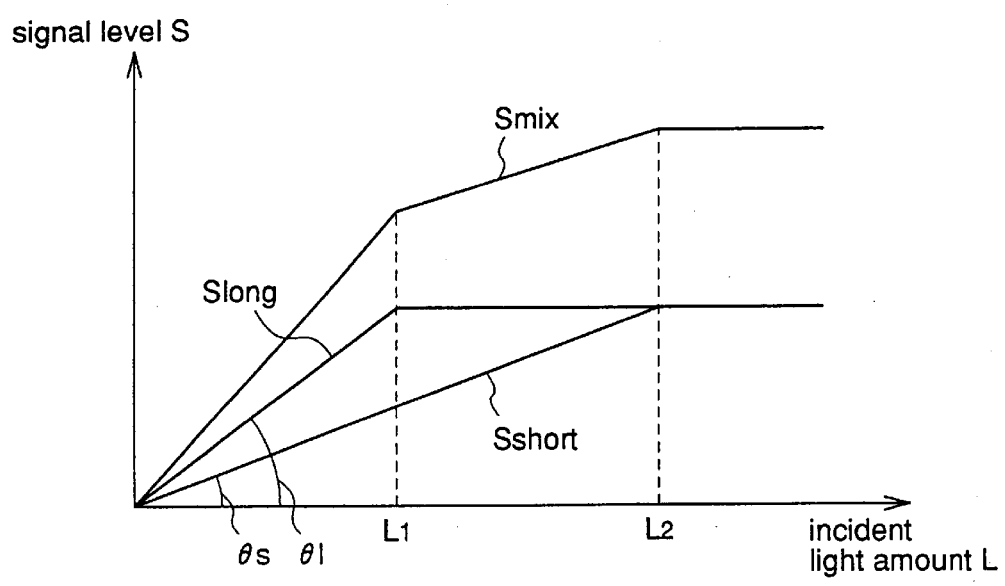
FIG. 4 is a characteristic diagram showing the relation between the Sshort signal, Slong signal, and Smix signal in the video camera according to the first embodiment of the present invention.

Therefore, in FIG. 4, when the light incident amount is within the range of L1~L2, the Slong signal is saturated while the Sshort signal has a large signal level. Therefore, relative to the prior art device shown in FIG. 17, the S/N ratio is improved, and as a result, the Smix signal is less affected by the noise components and a preferred display image is obtained.

(2) when the progressive scanning mode is selected

When this mode is selected, first of all, the light incident through the taking lens 10 is light-electricity converted in the progressive scanning CCD 11 to be output to the next stage.

On the other hand, in accordance with the controller not shown here, the output of the progressive scanning CCD 11 is switched by the second switch 19 so as to select the output of the signal adding means 17-1.

In this progressive scanning mode, the switching of the exposure time is not performed but video image of one screen is imaged within one field period (1V) to obtain an Slong signal, and this signal is read out to the respective CCDs 53 which individually correspond to the respective photodiodes 51, whereby the signal charges of the Slong signals of 480 lines are stored at the vertical transfer part 52. Therefore, the outputs of the upper and lower photodiodes 51 adjacent to each other are not added together as at the dynamic range enlarging mode.

In this way, the output from the progressive scanning CCD 11 is progressively scanned line by line, and after being delayed by time T2, input to the first scanning conversion means 15.

in this progressive scanning mode, the first scanning conversion means 15 functions as a 1H delay element which delays a signal by 1H. In other words, the Slong signal which is stored by one line unit is read out at the same speed as the writing speed so as to correspond to 1H under the non-interlacing system to be output with delayed by 1H.

The Slong signal of one line before being input to the first scanning conversion means 15 and the Slong signal of one line which is delayed by 1H by the first scanning conversion means 15 are input to the signal adding means 17-1, respectively.

The signal adding means 17-1 mutually adds the Slong signals of two lines which are adjacent each other in the vertical direction at pixel units. By this signal addition, in the later stage camera signal processing part, the same processing as processing the signals which are obtained by charge addition on CCD 53 can be performed as conventionally.

The output of the signal adding means 17-1 is input to the camera signal processing part 20 through the second switch 19, and it is subjected to the predetermined signal processing by the camera signal processing part 20 to be output as a non-interlacing system scanning signal.

Here, a switch may be provided between the delay means 13 and the first scanning conversion means 15 to selectively output the Slong signal of the CCD 11 divided in two fields, thereby realizing the interlacing processing.

Figure 5:
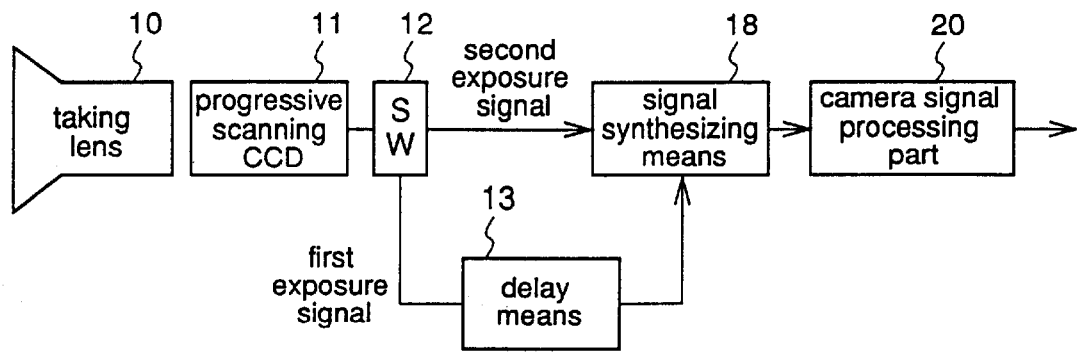
FIG. 5 is a block diagram illustrating a video camera according to an embodiment in which a part of the video camera according to the first embodiment of the present invention is omitted.

Further, in the above-described video camera 1, in order to simplify the structure, the signal adding means 17-1 can be omitted from the material constituting the video camera 1 as well as the first scanning conversion means 15, the second scanning conversion means 16, and the second switch 19 can be omitted as shown in FIG. 5.

Second Embodiment

Next, a video camera 2 according to the present invention, which is the above-described video camera 1 further including a third switch 23 and a vertical high frequency emphasizing means 24-2, will be described with reference to the drawings.

Figure 6:
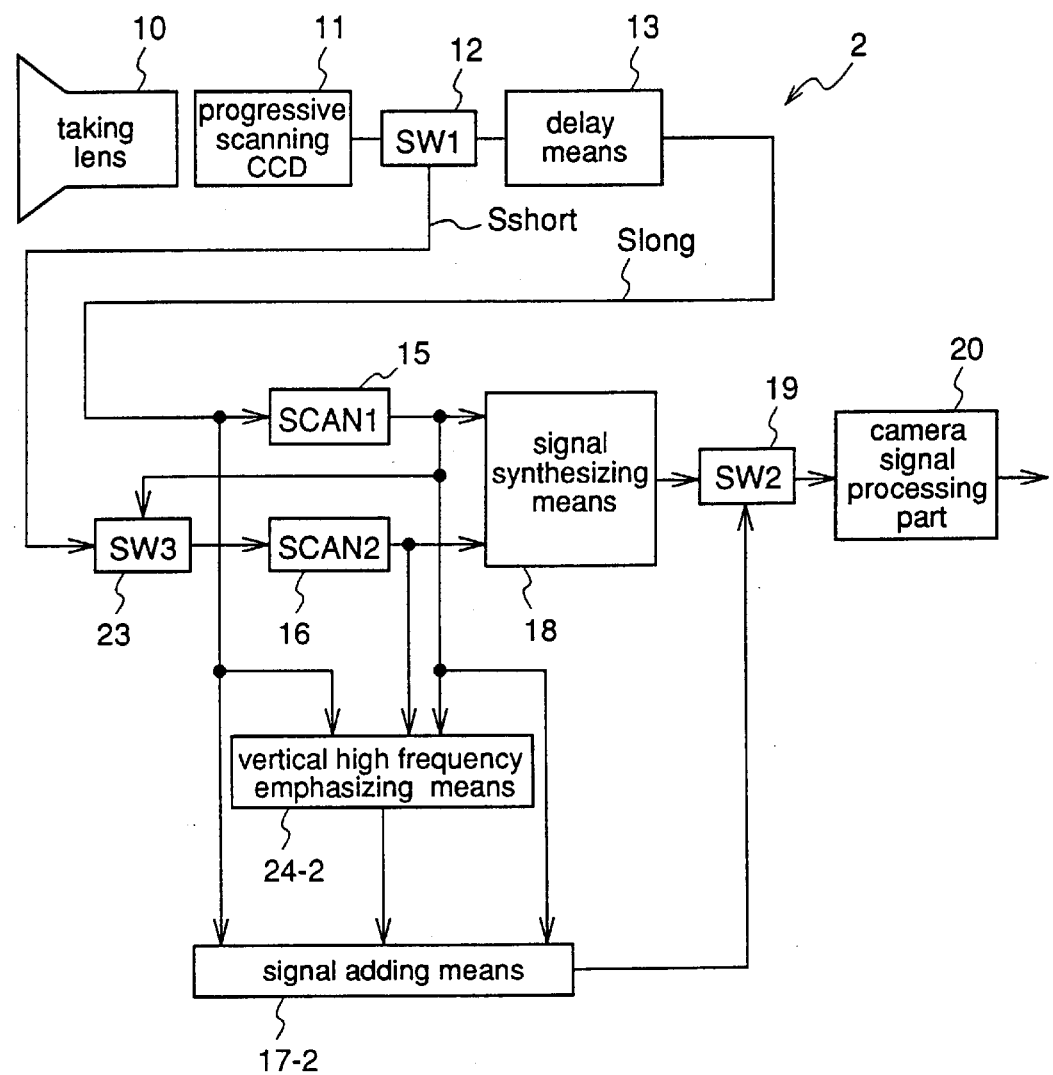
FIG. 6 is a block diagram illustrating a construction of a video camera according to a second embodiment of the present invention.

FIG. 6 is a block diagram illustrating a construction of the video camera 2, and the same reference numerals in FIG. 1 designate the same elements as in the video camera 1.

The third switch 23 can be switched such that it selects and outputs the Sshort signal selected by the first switch 12 when the dynamic range enlarging mode is selected in the progressive scanning CCD 11, and it selects and outputs the Sshort signal output from the first scanning conversion means 15 when the progressive scanning mode is selected.

Figure 7:
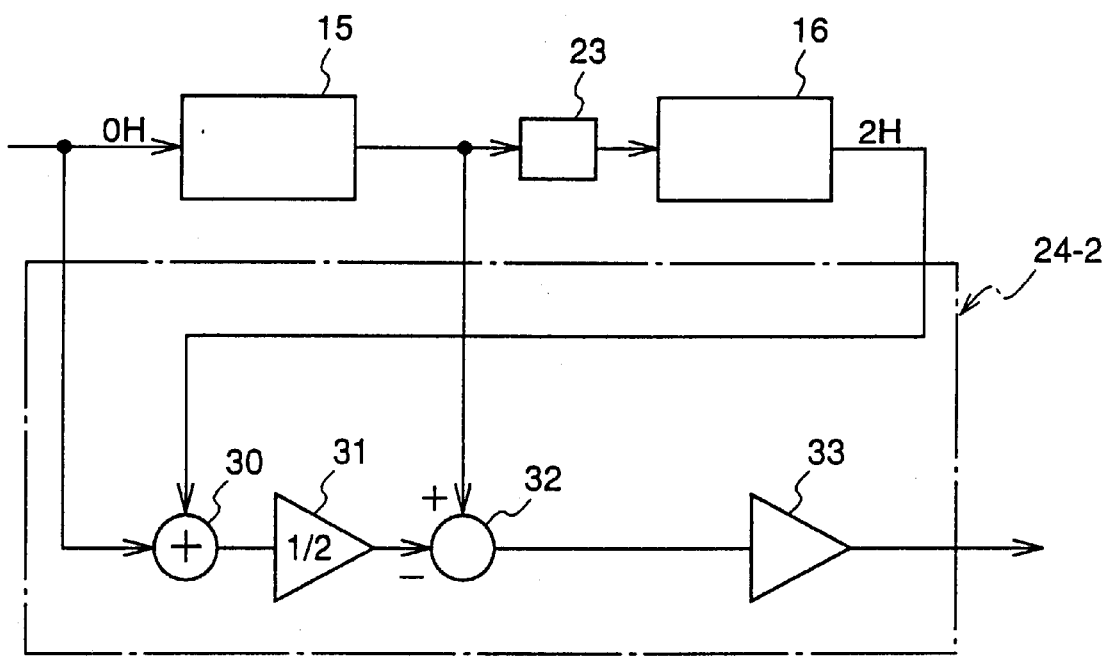
FIG. 7 is a block diagram illustrating a concrete construction of a vertical high frequency emphasizing means in FIG. 6.

The vertical frequency emphasizing means 24-2 is to extract vertical frequency emphasizing components based on the Slong signals of three lines before and after in the vertical direction. As shown in FIG. 7, it is constituted by an adding unit 30 adding the Slong signal output from the delay means 13 and the Slong signal delayed to be output from the second scanning conversion means 16, an attenuator 31 attenuating the output of the adding unit 31 to a half level, a subtracting unit 32 subtracting between the output of the attenuator 31 and the Slong signal delayed and output by the first scanning conversion means 15, and an output amplifier 33 for gain adjustment.

Since the other construction is similar to that of the video camera 1 shown in FIG. 1, the detailed description is omitted here.

Next, the operation of the above construction is described.
(1) when the dynamic range enlarging is selected When this mode is selected, by the controller which is not shown here, the second switch 19 is switched so as to select the output of the signal synthesizing means 18 and the third switch 23 is switched so as to select the Sshort signal from the first switch 12, respectively.

Since the basic operation until the Smix signal is obtained based on the Slong signal and the Sshort signal output from the progressively scanning CCD 11 is similar to that in the case of the above-described video camera 1, the description is omitted here.
(2) when the progressive scanning mode is selected When this mode is selected, by the controller not shown here, the second switch 19 is switched so as to select the output of the signal adding means 17-2 and the third switch 23 is switched so as to select the Slong signal from the first scanning conversion means 15, respectively.

The first scanning conversion means 15 and the second scanning conversion means 16 respectively functions as a 1H delay element which delays an input signal by 1H.

Accordingly, in the vertical high frequency emphasizing means 24-2, the three signals of the Slong signal output from the delay means 13, the Slong signal delayed by 1H by the first scanning conversion means 15, and the Slong signal which passes through the first scanning conversion means 15 and the third switch 23, and are delayed further by 1H by the second scanning conversion means 16, i.e., the Slong signals of three lines which are adjacent each other in the vertical direction, are input.

The vertical high frequency emphasizing means 24-2, after adding the Slong signal output from the delay means 13 and the Slong signal delayed and output by the second scanning conversion means 16 by means of the adding unit 30 provided therein, attenuates the output of the adding unit 30 to a half level by the next attenuator 31, and subsequently subtracts between the output of the attenuator 31 and the Slong signal delayed and output by the first scanning conversion means 15, by means of the subtracting unit 32. In this way, the vertical high frequency components are extracted and the signal thereof is output to the next stage from the vertical high frequency emphasizing means 24-2 after being gain adjusted by the output amplifier 33.

Then, the signal of the vertical high frequency emphasizing component extracted by the vertical high frequency means 24-2 is given to the signal adding means 17-2 together with the Slong signal output from the delay means 13 and the Slong signal delayed by 1H by the first scanning conversion means 15.

The signal adding means 17-2 adds the Slong signals of two lines which are adjacent each other in the vertical direction, at pixel units and further adds to the addition result the vertical high frequency components. And it inputs the result to the camera signal processing part 20 through the second switch 19 to be output as a non-interlacing system scanning signal after being subjected to the predetermined signal processing.

In this way, in the video camera 2 shown in the second embodiment, the signal output from the signal adding means 17-2 is high frequency emphasized in the vertical direction. Therefore, it can be intended to realize the high resolution in the vertical direction as well as to avoid washboards as compared to the video camera 1.

Third Embodiment

Figure 8:
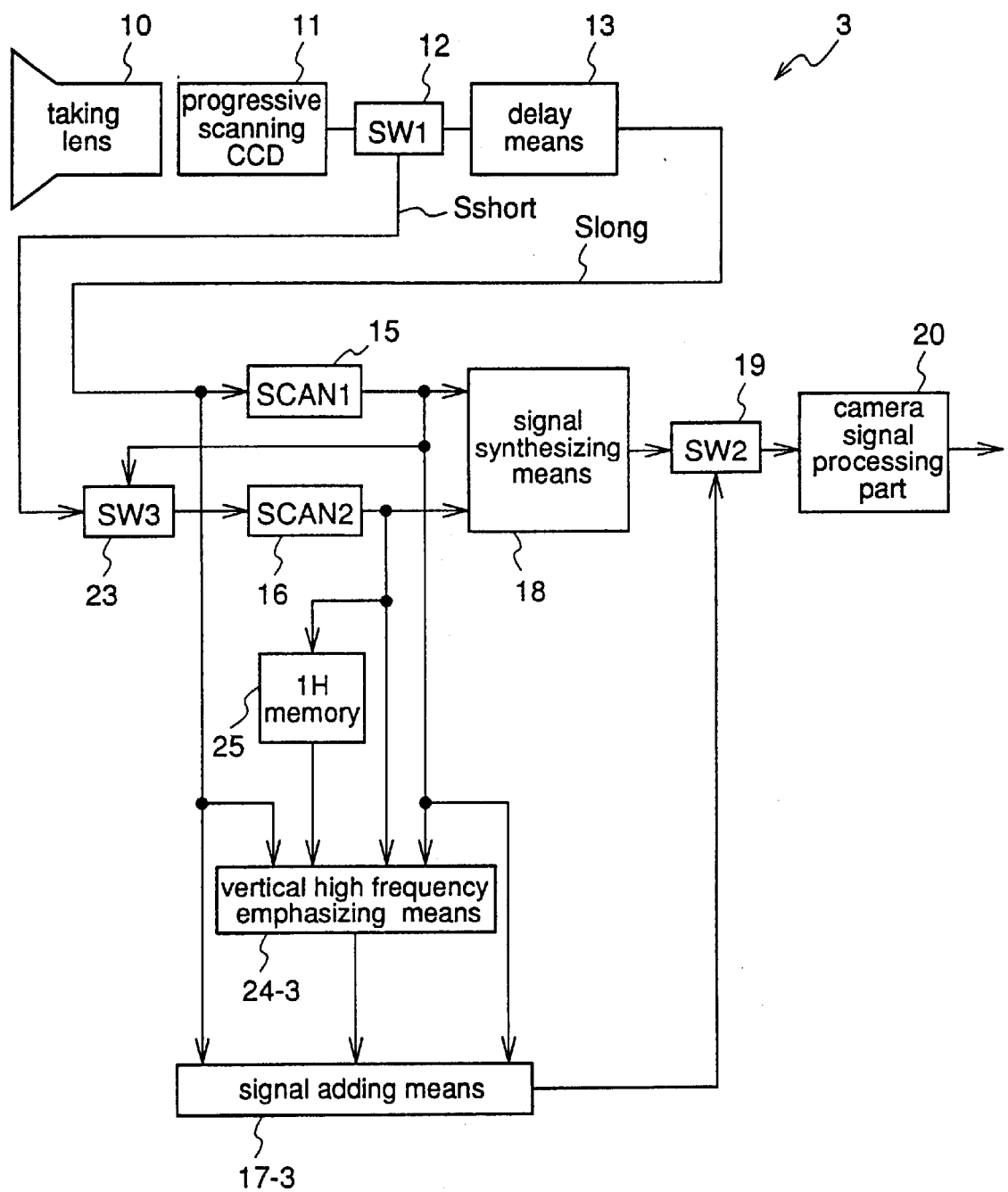
FIG. 8 is a block diagram illustrating a construction of a video camera according to a third embodiment of the present invention.

A video camera 3 which is the above-described video camera 2 further including a 1H memory 25 and in which a vertical high frequency emphasizing means 24-3 is constituted as shown in FIG. 8, will be described as a third embodiment of the present invention with reference to the drawings.

FIG. 8 is a block diagram illustrating a construction of the video camera 3, and the same reference numerals designate the same elements as in the video camera 2 shown in FIG. 6.

While in video camera 2, the vertical high frequency emphasizing components are extracted based on the Slong signals of three lines which are adjacent each other in the vertical direction, in this video camera 3, it is characterized in that the vertical high frequency emphasizing components are extracted based on the Slong signals of four lines which are adjacent each other in the vertical direction.

Here, the 1H memory 25 is to delay the Slong signal of one line by 1H.

Figure 9:
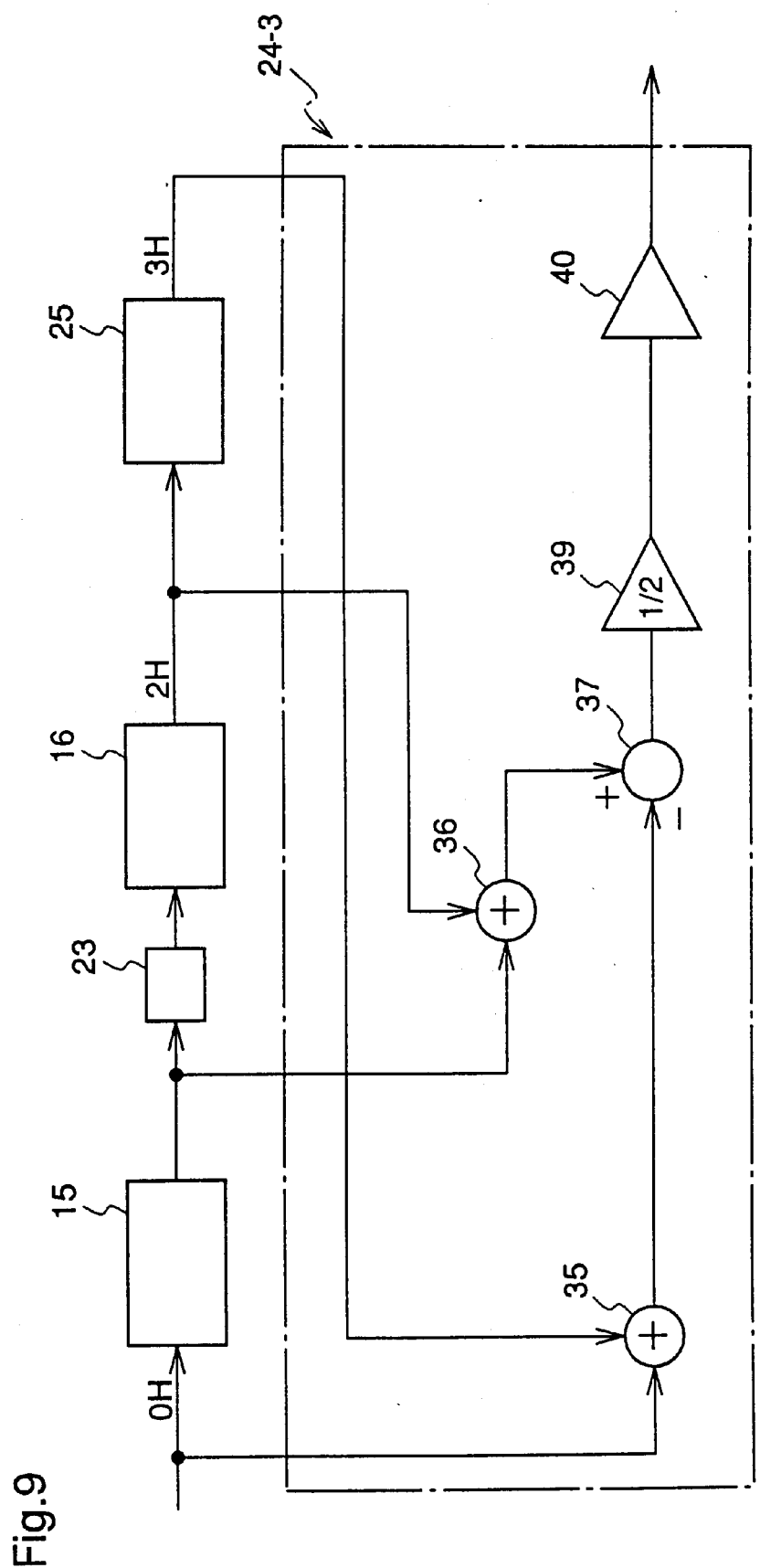
FIG. 9 is a block diagram illustrating a concrete construction of a vertical high frequency emphasizing means in FIG. 8.

The vertical high frequency emphasizing means 24-3 is constituted, as shown in FIG. 9, by a first adding unit 35 adding the Slong signal output from the delay means 13 and the Slong signal delayed and output by the 1H memory 25, a second adding unit 36 adding the Slong signal delayed and output by the first scanning conversion means 15 and the Slong signal delayed and output by the second scanning conversion means 16, a subtracting unit 37 subtracting the output of the first adding unit 35 from the output of the second adding unit 36, an attenuator 39 attenuating the output of the subtracting unit 37 to a half level, and an output amplifier 40 for gain adjustment.

Since the other construction is similar to that of the video camera 2 shown in FIG. 6, the detailed description is omitted here.

Next, the operation of the above construction is described.
(1) when dynamic range enlarging mode is selected When this mode is selected, by the controller not shown here, the second switch 19 is switched so as to select the output of the signal synthesizing means 18 and the third switch 23 is switched so as to select the Sshort signal output from the first switch 12, respectively.

Since the basic operation until the Smix signal is obtained based on the Slong signal and the Sshort signal output from the progressive scanning CCD 11 is similar to that in the case of the above-described video camera 1, the description is omitted here.

(2) when the progressive scanning mode is selected

When this mode is selected, by the controller not shown here, the second switch 19 is switched so as to select the output of the signal adding means 17-3 and the third switch 23 is switched so as to select the Slong signal from the first scanning conversion means 15, respectively.

As in the case of the above-described video camera 2, the first scanning conversion means 15 and the second scanning conversion means 16 respectively function as a 1H delay element which delays a signal by 1H.

Accordingly, in the vertical high frequency emphasizing means 24-3, four signals of the Slong signal output from the delay means 13, the Slong signal delayed by 1H by the first scanning conversion means 15, the Slong signal which passes through the first scanning conversion means 15 and the third switch 23 and is delayed further by 1H by the second scanning conversion means 16, and the Slong signal which passes further the 1H memory 25 from the second scanning conversion means 16 to be delayed by 1H, i.e., the Slong signals of four lines which are adjacent each other, are input together.

The vertical high frequency emphasizing means 24-3 adds by the adding unit 35 the Slong signal output from the delay means 13 and the Slong signal delayed and output by the 1H memory 25, while it adds by the adding unit 36 the Slong signal delayed and output by the first scanning conversion means 15 and the Slong signal delayed and output by the second scanning conversion means 16. The subtracting unit 37 subtracts the output of the first adding unit 35 from the output of the second adding unit 36, and subsequently the vertical high frequency emphasizing components are extracted by attenuating the output of the subtracting unit 37 to the ½ level by the attenuator 39, and the signal thereof is gain adjusted by the output amplifier 40 to be output.

The signal of the vertical high frequency emphasizing component extracted by the vertical high frequency emphasizing means 24-3 is given to the signal adding means 17-3 together with the Slong signal output from the delay means 13 and the Slong signal delayed by 1H by the first scanning conversion means 15.

The signal adding means 17-3 adds the Slong signals of two lines which are adjacent each other in the vertical direction in the progressive scanning CCD 11, at pixel units, and further adds to this the vertical high frequency emphasizing component to be output in the next stage. The signal output from the signal adding mean 17-3 is input to the camera signal processing part 20 through the second switch 19, and it is subjected to the predetermined signal processing by the camera signal processing part 20 to be output as a non-interlacing system scanning signal.

In this way, in the third embodiment, the vertical high frequency emphasizing is performed with respect to the Slong signals of at least four lines in the vertical direction in the progressive scanning CCD 11 by the vertical high frequency emphasizing means 24-3. Therefore, it is possible to realize the vertical high resolution in the vertical high frequency emphasizing, thereby improving the quality of the video image.

In the third embodiment, while an example which uses two scanning conversion means 15 and 16 and only one 1H memory 25 is shown, a construction in which more scanning conversion means and more 1H memories than in this case are used is also possible.

Fourth Embodiment

Further, a video camera 4 according to the present invention having a construction which is partly different from those of the above-described video camera 1, video camera 2, and video camera 3, will be described with reference to the drawings.

Figure 10:
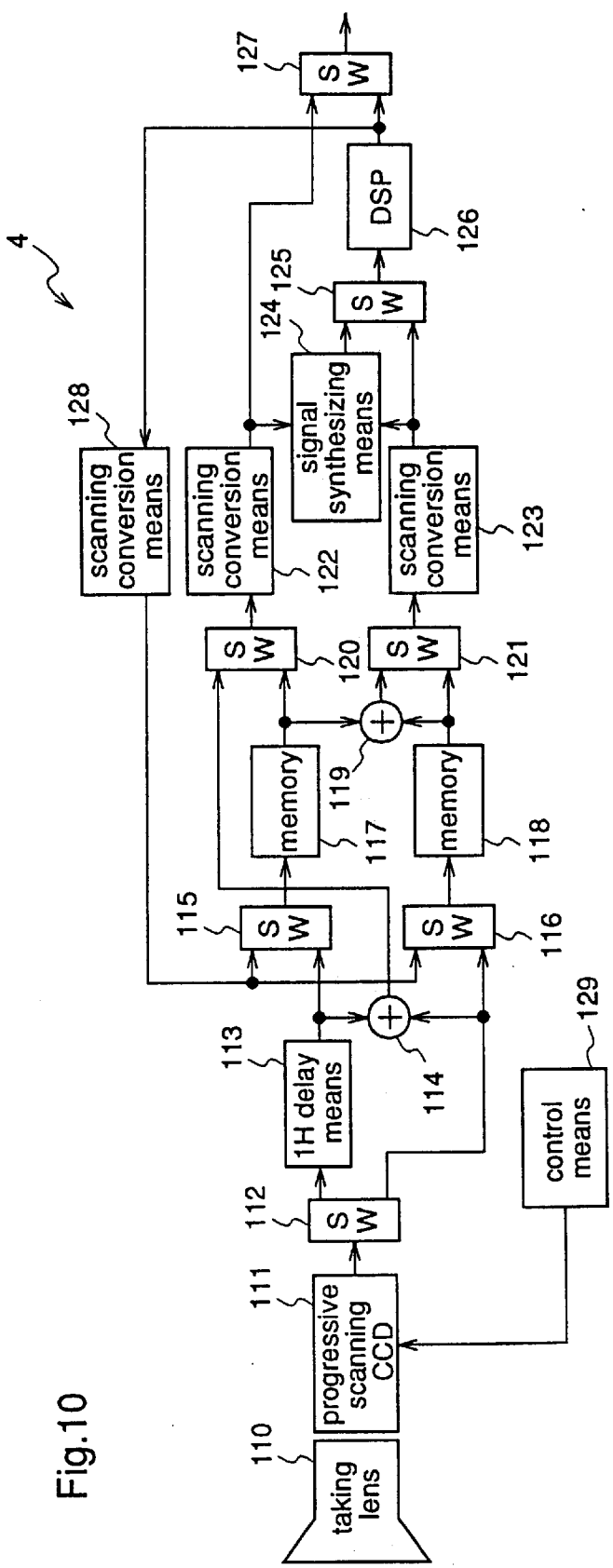
FIG. 10 is a block diagram illustrating a construction of a video camera according to a fourth embodiment of the present invention.

FIG. 10 is a block diagram illustrating the construction of the video camera 4.

In FIG. 10, the reference numeral 110 designates a taking lens, the numeral 111 designates a progressive scanning CCD, the numeral 113 designates a 1H delay means delaying a signal by 1H. The numeral 114 designates a first adding means, the numeral 119 designates a second adding means, the numeral 117 designates a first memory, and the numeral 118 designates a second memory. The numeral 122 designates a first scanning conversion means making the sampling rate to a half, and the numeral 123 designates a second scanning conversion means making the sampling rate to a half. The numeral 124 designates a signal synthesizing means and the numeral 126 designates a digital signal processor (hereinafter "DSP") as a camera signal processing part. The numeral 128 designates a third scanning conversion means making the sampling rate to twice, and the numeral 129 designates a control means for controlling the driving method of the progressive scanning CCD 111. In addition, the numerals 112, 115, 116, 120, 121, 125, and 127 designate first to seventh switches. The respective operation modes of the video camera 4 of the enlargement of dynamic range, the successive picturing of frames, and the enlargement of dynamic range of frame still images are realized by appropriately operating these switches and the control means 129.

Here, one horizontal period in the 1H delay means 113 is one horizontal period in progressively scanning, i.e., a half horizontal period in interlaced scanning (standard television signal).

Hereinafter, in the video camera 4 constructed as above, the operations of respective parts when dynamic range enlarging mode (the state in which the dynamic range of output of the progressive scanning CCD 111 is enlarged) is selected, when the mode of successively picturing frames (state in which output of the progressive scanning CCD 111 is adapted to the successively picturing of frame) is selected, and when the mode of enlarging dynamic range for frame still images (state in which output of the progressive scanning CCD 111 is adapted to the frame still image and the dynamic range of this frame still image is enlarged) is selected, will be described.

(1) when the dynamic range enlarging mode is selected

Figure 11:
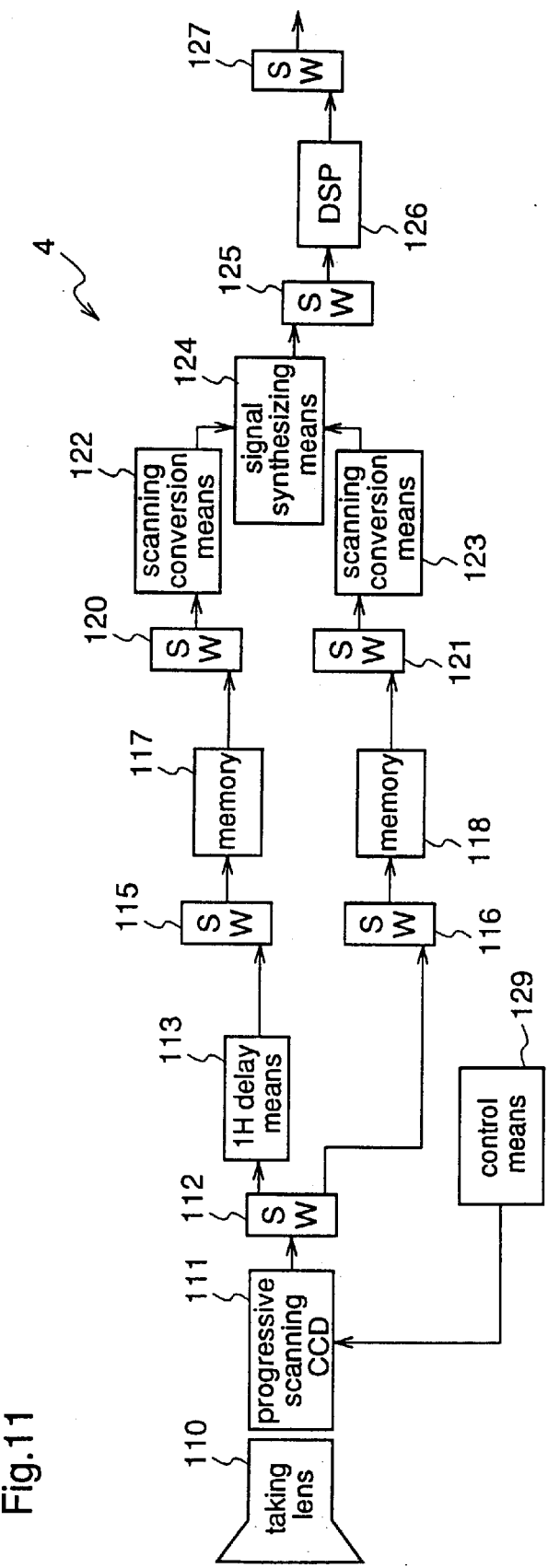
FIG. 11 is a block diagram illustrating the video camera according to the fourth embodiment of the present invention when the mode of enlarging the dynamic range is selected.

FIG. 11 is a block diagram illustrating the construction when this mode is selected. In other words, it is the construction in which inputs of the second switch 115, the third switch 116, the fourth switch 120, the fifth switch 121, the sixth switch 125, and the seventh switch 127 are fixed to one side in the construction shown in FIG. 10.

First, the light incident through the taking lens 110 is light-electricity converted in the progressive scanning CCD 111. Since the operation of the progressive scanning CCD 111 is similar to that of the above-described progressive scanning CCD 11, the description is omitted here. In this case, a first exposure time T1 is set to $1/60$ sec. and a second exposure time T2 is set to $1/180$ sec.

The outputs from the progressive scanning CCD 111 are separated into the Slong signal and the Sshort signal by the first switch 112, the Slong signal is input to the 1H delay means 113 and the Sshort signal is input to the second memory 118 through the second switch 116.

The 1H delay means 113 delays the Slong signal by one horizontal period to be output at the same timing as the Sshort signal, and inputs the same to the first memory 117 through the second switch 115. Here, the progressive scanning CCD 111 enables to output a television signal which has the scanning lines twice as many as those of a normal television signal (such as a NTSC signal). Therefore, the numbers of the lines of the Slong signal and the Sshort signal in one vertical period are both the same as the number of the scanning lines of a standard television signal. In other words, the Slong signal and the Sshort signal exist only in a half period of one horizontal period of the standard television signal.

As the first memory 117 and the second memory 118, a DRAM can be used, for example. In this video camera 4, as described above, the inputs to the first memory 117 and the second memory 118 exist only in a half period of one horizontal period of the standard television signal. Therefore, even if the first memory 117 and the second memory 118 are DRAMs of one port, the writing period and the reading period can be alternatingly switched.

The output timings of the first memory 117 and the second memory 118 are set so as to correct the time lag between the Slong signal and the Sshort signal to synthesize the signals. In other words, the Slong signal is read out from the first memory 117 at the reading time which is delayed by time (T2−T1). As a result, the Slong signal from the first memory 117 and the Sshort signal from the second memory 118 can be synchronized.

The outputs of the first memory 117 and the second memory 118 are input to the first scanning conversion means 122 and the second scanning conversion means 123 through the fourth switch 120 and the fifth switch 121, respectively. The first scanning conversion means 122 and the second scanning conversion means 123 convert the Slong signal and the Sshort signal, both of which have the double speed, into signals having the normal speed (signals corresponding to the standard television signals), respectively. In other words, the clock frequencies are decreased by half.

The outputs from the first scanning conversion means 122 and the second scanning conversion means 123 are input to the signal synthesizing means 124, and the inputs from these two series are output as an Smix signal of one series, whose dynamic range is enlarged. It is then input to the DSP 126 through the sixth switch 125. The DSP 126 converts an input signal to a luminance signal and a color difference signal, for example, to output through the seventh switch 127.

As described above, the signal whose dynamic range is enlarged can be obtained from two signals whose exposure times are different from each other.

(2) when the mode of successively picturing frames is selected

Figure 12:
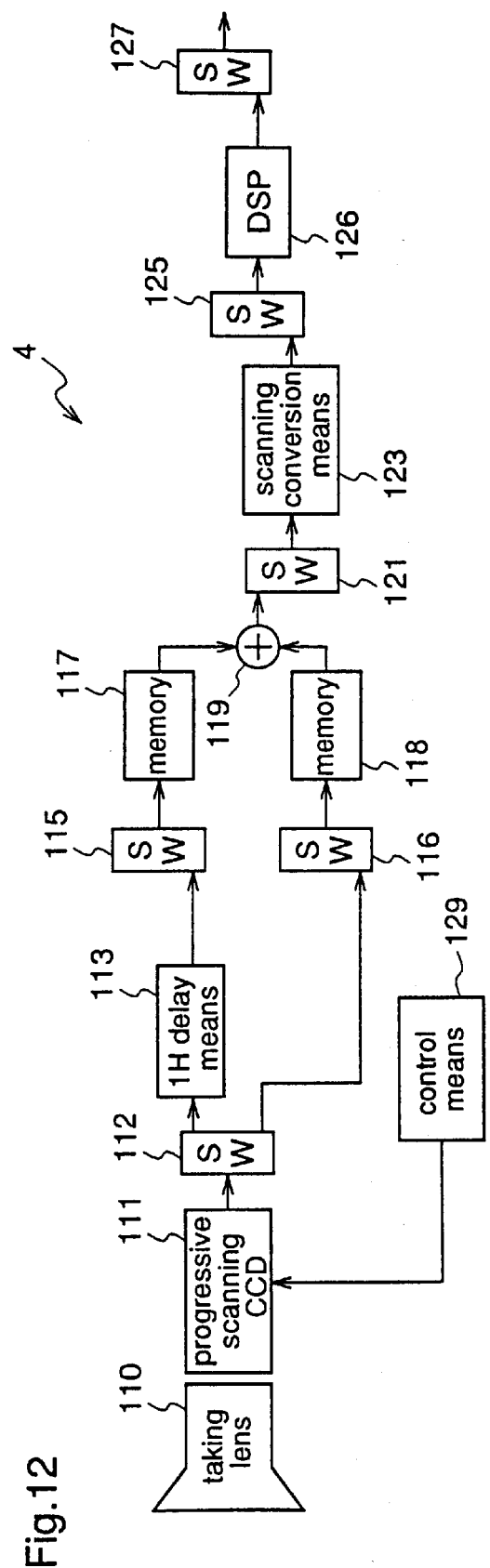
FIG. 12 is a block diagram illustrating the video camera according to the fourth embodiment of the present invention when the mode of successively picturing frames is selected.

FIG. 12 is a block diagram illustrating a construction of the video camera 4 in the mode of successively picturing frames.

In this case, the progressive scanning CCD 111 performs the normal operation outputting the progressive scanning signals by the control means 129. The progressive scanning signals which have the frame frequency of 60 Hz, each frame having 525 scanning lines (the number of the effective scanning lines is 480) are output from the progressive scanning CCD 111.

Hereinafter, the operation of the video camera 4 in this mode is described.

The signals are progressively scanning output from the progressively scanning CCD 111. Within each frame of the television signals (one frame=1/60 sec.), only the signals of odd line are selected through the first switch 112 and input to the 1H delay means 113 to be delayed for one horizontal scanning period. The signals are then written in the first memory 117 through the second switch 115. Similarly, only the signals of even line are selected through the switch 112 and the selected signals are written in the second memory 118 through the third switch 116.

Here, the writing into the first memory 117 and the second memory 118 is performed every other frame, i.e., after writing for one frame, the writing for the next frame is not performed.

For the next two frames (1/60 sec.×2=1/30 sec.), the signals output from the first memory 117 and the second memory 118 are added by the second adding means 119 to be output to the fifth switch 121 as an interlacing signal.

The first memory 117 and the second memory 118 repeatedly output the frame twice (twice of 1/60 sec.) and the second adding means 119 performs adding, with the pair to be added shifted by one line for each frame. Therefore, it is output to the fifth switch 121 as a frame image of an interlacing signal.

The signal output from the fifth switch 121 is converted so as to have the normal signal speed by the second scanning conversion means 123 and converted to a proper standard television signal. It is then passed through the sixth switch 125 without passing through the signal synthesizing means 124 and is converted to a luminance signal and a color difference signal by the DSP 126 as a camera signal processing part to be output through the seventh switch 127.

The signal output from the seventh switch 127 becomes two fields division interlacing output of video images by successive picturing frames of 1/30 sec.

In this way, the frame processing is realized.

(3) when the mode of enlarging dynamic range of frame still image is selected

Figure 13:
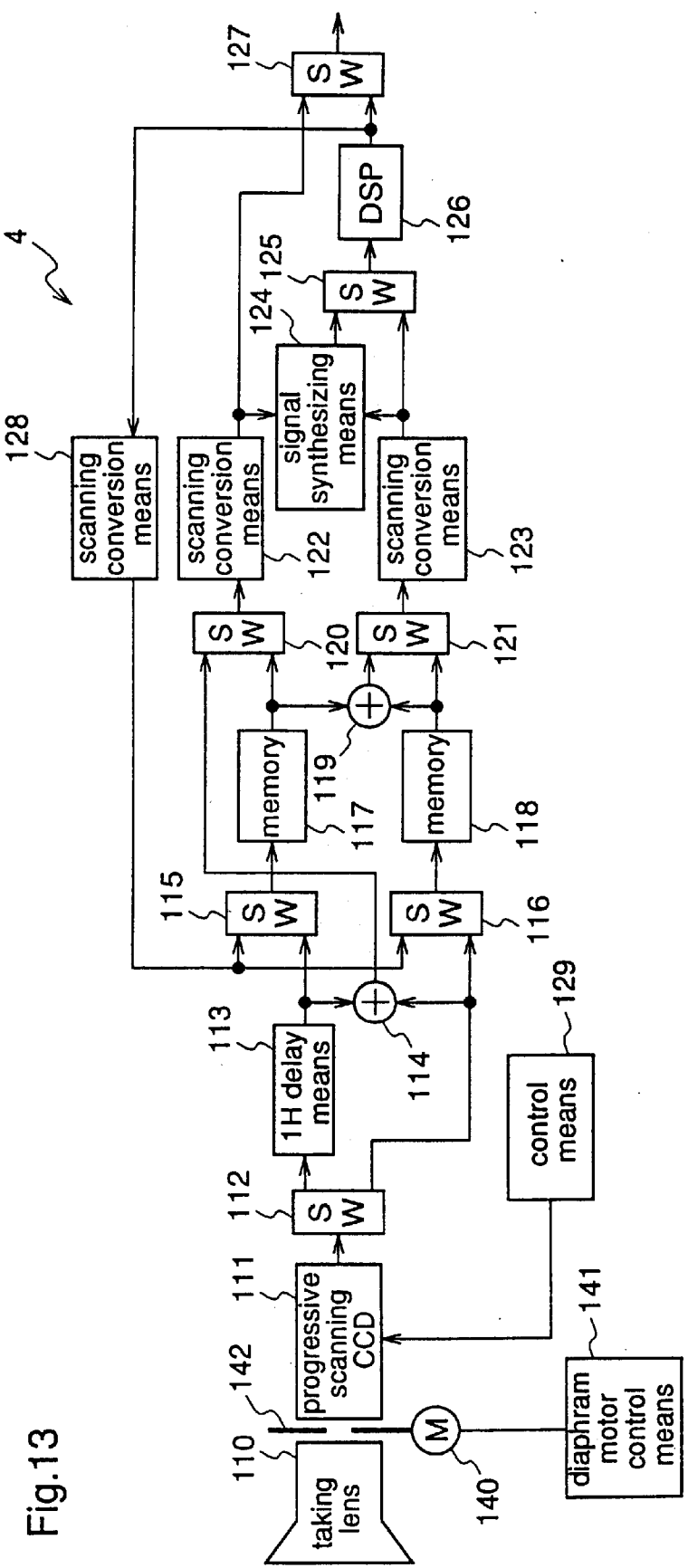
FIG. 13 is a block diagram illustrating the video camera according to the fourth embodiment of the present invention when the mode of enlarging the dynamic range for frame still images is selected.

FIG. 13 is a block diagram illustrating a construction of the video camera 4 in the mode of enlarging the dynamic range for the frame still image. In this FIG. 13, to simplify the description, a shutter 142, a shutter motor 140 driving the shutter 142, and a diaphragm motor control means 141 controlling the shutter motor 140 are added to the video camera 4 shown in FIG. 10.

Figure 14:
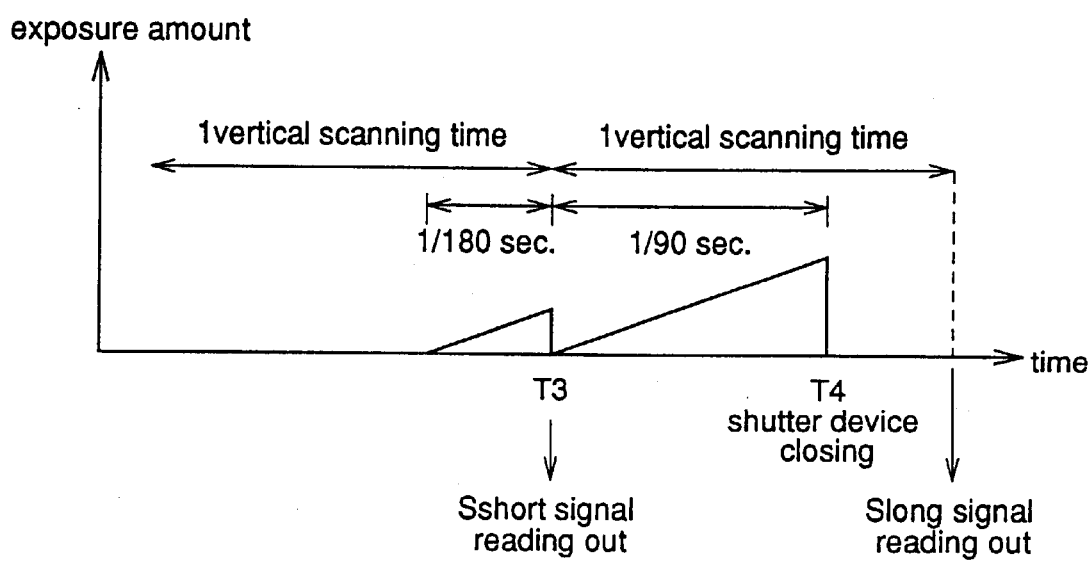
FIG. 14 is a diagram illustrating the timing of a signal being output from a progressive scanning CCD in the video camera according to the fourth embodiment of the present invention.

FIG. 14 is a timing diagram showing the timing of the signal output from the progressive scanning CCD 111 when the dynamic range of the frame still images is realized in the video camera 4. As shown in FIG. 14, in the video camera 4, after exposure during 1/180 sec., the Sshort signal is read out at timing T3, then after exposure during 1/60 sec., the shutter is closed at timing T4, and the Slong signal is read out after the predetermined time.

Hereinafter, the operation of the video camera 4 in this mode is described.

First of all, the Sshort signals of one frame are progressively scanning output from the progressive scanning CCD 111 in the first field (1/60 sec.). Only signals of odd line are selected to be input to the 1H delay means 113 through the first switch 112. The signals of odd line are written in the first memory 117 through the second switch 115 after being delayed by the 1H delay means 113 for one horizontal period. Similarly, only signals of even line are selected through the first switch 112 and written in the second memory 118 through the third switch 116.

In the second field, the shutter motor 140 operates in accordance with the shutter control signal output from the diaphragm motor control means 141 and the shutter 142 switches from the open state to the close state, thereby shielding the light incident into the progressive scanning CCD 111. As a result, the exposure operation of the progressive scanning CCD 111 is stopped. Next, the Slong signals of one frame are output from the progressive scanning CCD 111, and only signals of odd line are selected through the first switch 112 and input to the 1H delay means 113 to be input to the first adding means 114 after being delayed for one horizontal scanning period. Similarly, only signals of even line are selected through the first switch 112 to be input to the first adding means 114. In this case, the Slong signal is not written in the first memory 117 or the second memory 118.

To perform the signal processing at a normal speed, as the driving of the progressive scanning CCD 11, the Slong signal of one frame is divided into two fields, i.e., an upper half and a lower half of the display, whereby the signal processing is performed.

The Slong signal added in the line direction by the first adding means 114 is input to the fourth switch 120. It is then input to the signal synthesizing means 124 after the predetermined scanning conversion is performed by the first scanning conversion means 122.

On the other hand, the Sshort signals read out from the first memory 117 and the second memory 118 are input to the second adding means 119 and added in the line direction to be input to the fifth switch 121. It is then input to the signal synthesizing means 124 after the predetermined scanning is performed by the second scanning conversion means 123.

The Sshort signal and the Slong signal which are input to the signal synthesizing means 124 are both progressive scanning signals. The Slong signal and the Sshort signal which are input to the signal synthesizing means 124 are synthesized to become the Smix signal whose dynamic range is enlarged.

Next, the Smix signal is input to the DSP 126 as a camera signal processing part through the sixth switch 125 to be converted into the luminance signal and the color difference signal. As the still images of one frame, whose dynamic ranges are enlarged, through the third scanning conversion means 128 the odd lines of the luminance signal and the color difference signal which are output form the DSP 126 are written in the first memory 117 through the second switch 115. And the third even lines thereof are written in the second memory 118 through the third switch 116.

Then, the odd line is output from the first memory 117 and scanning converted by the first scanning conversion means 122 through the fourth switch 120 to be input to the seventh switch 127.

On the other hand, the even line is output from the second memory 118, scanning converted by the second scanning conversion means 123 through the fifth switch 121, and passes through the DSP 126 through the sixth switch 125 to be input to the seventh switch 127.

The signals input to the seventh switch 127 are switched between an odd signal and an even signal every field by the seventh switch 127 to be output as the frame still image whose dynamic range is enlarged.

Figure 15:
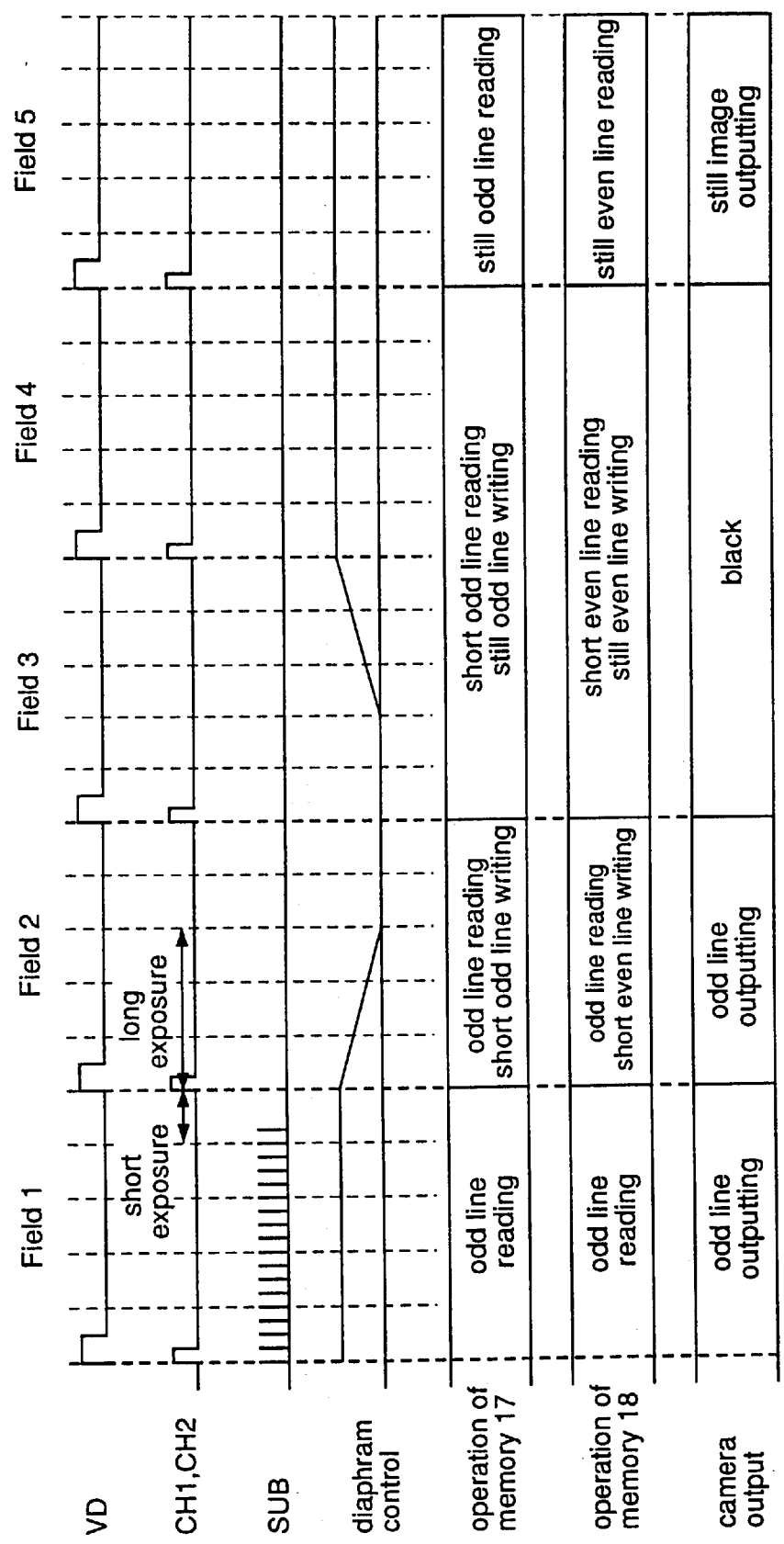
FIG. 15 is a timing diagram showing the operation of the video camera according to the fourth embodiment of the present invention.

The operation as described above is explained with a timing diagram shown in FIG. 15.

In FIG. 15, the Sshort signal of one frame, which is progressively scanning output from the progressive scanning CCD 111, is produced in field 1 (one field=1/60 sec.). It is preferable to apply suitable SUB voltage to the progressive scanning CCD 111 to produce the Sshort signal. In field 1, video images of the odd field are output from the first memory 117 and the second memory 118.

When signal reading pulses CH1 and CH2 are given to the progressive scanning CCD 111 at the first timing in field 2, the Sshort frame image is output for one field in field 2. Among this, only odd lines are selected through the first switch 112 to be input to the 1H delay means 113, and written in the first memory 117 through the second switch 115 after being delayed for one horizontal scanning period. Similarly, only even lines are selected through the first switch 112 and written in the second memory 118 through the third switch 116.

In addition, the shutter control is performed in field 2. In FIG. 13, while opening and closing of the diaphragm are explained as a shutter, a shutter device may be added in addition to the diaphragm. In field 2, the shutter closes and the Slong signal is stored on the progressive scanning CCD 111.

At the first timing of field 3, CH1 and CH2 are applied again and the Slong signal is read out. The reading out of the Slong signal is performed for two field, i.e., field 3 and field 4. The Slong signal of one frame which is progressively scanning output is synthesized with the Sshort signals which are read out from the first memory 117 and the second memory 118 by the signal synthesizing means 124, and written in the space areas of the first memory 117 and the second memory 118 through the DSP 126. After field 5, the frame still image whose dynamic range is enlarged is successively output.

Here, an example in which the Sshort signal is read out earlier from the progressive scanning CCD 111 is shown. This is because the operation dispersion of the shutter device for producing the Slong signal is relatively larger and it is more preferable to produce the Sshort signal requiring high accuracy of time control by an electronic shutter. However the Slong signal can be produced by the shutter and the Sshort signal can be realized by the shutter device, on the contrary.

The progressive scanning processing in the dynamic range enlargement of the frame still image is described.

In the construction shown in FIG. 13, the processing at double speed is performed by the signal synthesizing means 124 and the DSP 126. In this case, the frame still image of the Sshort signal is read out from the progressive scanning CCD in the first field to be stored in the first memory 117 and the second memory 118.

Next, all the frame still images of the Slong are read out from the progressive scanning CCD 111 in the second field. The Sshort signal and the Slong signal are synthesized by the signal synthesizing means 124 at the double speed and processed by the DSP 126 at the double speed to produce the luminance signal and the color difference signal as the frame still image whose dynamic range is enlarged.

Then, the odd line is written in the first memory 117 through the second switch 115, and even line is written in the second memory 118 through the third switch 116. As a result, it becomes unnecessary to store a half display of the Slong signal on CCDs constituting the progressive scanning CCD 111 for one field, whereby superimposing of the dark current noise in the CCDs constituting the progressive scanning CCD 111 can be avoided.

Fifth Embodiment

Next, a video camera 5 which is constituted by adding a hand blurring correcting function to the above-described video camera 4 will be described with reference to the drawings as a fifth embodiment of the present invention.

Figure 16:
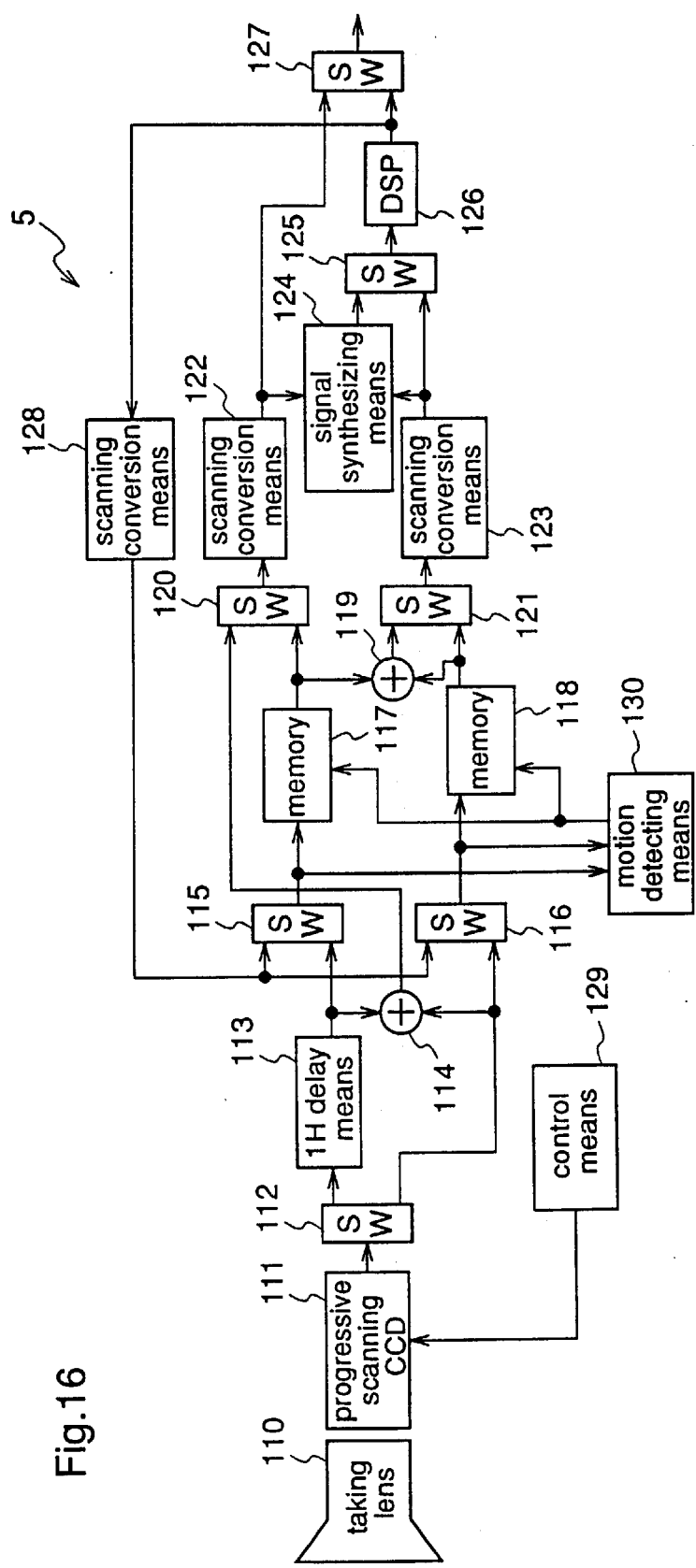
FIG. 16 is a block diagram showing a construction of a video camera according to a fifth embodiment of the present invention.

FIG. 16 is a block diagram illustrating a construction of the video camera 5, and the video camera 5 is characterized in that a motion detecting means 130 is added to the video camera 4 shown in FIG. 10.

In FIG. 16, inputs into the first memory 117 and the second memory 118 are input to the motion detecting means 130. In the motion detecting means 130, motion vector information corresponding to hand blurring is obtained to be supplied to the first memory 117 and the second memory 118 as a memory control signal. In this case, as a construction of the motion detecting means 130, the conventional method such as representative point matching method may be used.

Additionally, in the motion detecting means 130, the construction in which the Slong signal and the Sshort signal are input, and motion are detected in each series to be synthesized, resulting in the motion vector information, or the construction in which one signal, preferably only Slong signal, is input, and the motion is detected, resulting in the motion vector information, may also be used.

In this case, the memory capacity can be saved by writing only hand blurring correction range which is previously predicted in the memory. Decreasing of the memory capacity is effective when the present invention is applied to a camera in PAL system having numerous vertical lines. In the fifth embodiment, the progressive scanning CCD 111 having pixel allowance for hand blurring is preferable.

Producing of signals to the memory for hand blurring allowance may be performed with respect to the horizontal direction, the vertical direction, or horizontal and vertical directions.

As described above, the video camera 5 according to the fifth embodiment of the present invention can realize the hand blurring correcting function which effectively utilizes the memory as well as the dynamic range enlargement.

What is claimed is:

1. A video camera which, comprising a progressive scanning CCD, a driving means for driving the progressive scanning CCD, and a camera signal processing part for converting an output of the progressive scanning CCD to a video signal adaptive to a video image display, enables enlarging dynamic range by synthesizing a first signal which is obtained by exposure during a first predetermined time and a second signal which is obtained by exposure during a predetermined time after the exposure time of the first signal, by means of the progressive scanning CCD, enlarging luminance gradation characteristics on appearance, and which enables outputting the first signal output from the progressive scanning CCD as a progressive scanning signal by selecting a method of driving the progressive scanning CCD by the driving means, said video camera further comprising:

a separating means for separating the first signal and the second signal which are output from the progressive scanning CCD at different timings;

a signal synthesizing means for synthesizing the first signal and the second signal to produce a synthesized signal;

a delay means for receiving the first signal output from the separating means and delaying the first signal by a predetermined time so that the second signal and the first signal are simultaneously input to the signal synthesizing means;

a first scanning conversion means for performing scanning conversion so that the first signal of one line is output for a time corresponding to one horizontal scanning period;

a second scanning conversion means for performing scanning conversion so that the second exposed signal of one line is output for a time corresponding to one horizontal scanning period;

the signal synthesizing means synthesizing a signal which is scanning converted by the first scanning conversion means to be output and a signal which is scanning converted by the second scanning means to be output to produce a synthesized signal;

a signal adding means for mutually adding the first signals of two lines which are adjacent each other in the vertical direction at pixel units; and a switch for selecting a signal output from the signal synthesizing means or a signal output from the signal adding means, in accordance with the method of driving the progressive scanning CCD to give the same to the camera signal processing part.

2. The video camera of claim 1 wherein:

the first scanning conversion means functions also as a delay element which delays the first signal of one horizontal scanning period; and the first signals before and after passing through the first scanning conversion means are both input to the signal adding means.

3. The video camera of claim 2 which comprises a vertical high frequency emphasizing means for extracting a vertical high frequency emphasizing component based on the first signals of at least three lines which are adjacent each other in the vertical direction.

4. The video camera of claim 3 wherein:

the second scanning conversion means functions also as a delay element which delays the first signal by one horizontal scanning period; and the first signals before and after passing through the second scanning conversion means and the first scanning conversion means, respectively are input to the vertical high frequency emphasizing means together.

5. The video camera of claim 4 wherein:

a one horizontal scanning period delay element for delaying the first signal by one horizontal scanning period is applied to the first scanning conversion means and the second scanning conversion means; and the first signals before and after passing through the one horizontal scanning period delay element are input to the vertical high frequency emphasizing means together.

6. A video camera which, comprising a progressive scanning CCD, and a camera signal processing part for converting an output from the progressive scanning CCD to a video signal adaptive to video image display, enables enlarging dynamic range by synthesizing a first signal which is obtained by exposure during a first predetermined time and a second signal which is obtained by exposure during a second predetermined time after the exposure time of the first signal, by means of the progressive scanning CCD to enlarge luminance gradation characteristics on appearance, wherein the progressive scanning CCD enables outputting of the first signal and the second signal at different timings, said video camera further comprising:

a signal separating switch for separating the first signal and the second signal which are output from the progressive scanning CCD;

a delay means for delaying an output from the signal separating switch by one horizontal scanning period;

a first memory for temporarily storing an output from the delay means;

a second memory for temporarily storing the second signal which is output from the signal separating switch;

a first scanning conversion means for converting an output from the first memory to a normal speed signal;

a second scanning conversion means for converting an output from the second memory to a normal speed signal;

a synthesizing means for synthesizing the first signal and the second signal, synchronized and having normal speeds, which are output from the first scanning conversion means and the second scanning conversion means;

a signal separating switch for separating a signal of odd line and a signal of even line of progressive scanning signals which are output from the progressive scanning CCD enabling also outputting progressive scanning signals;

an adding means for adding outputs from the first memory and the second memory for two fields;

a scanning conversion means for converting an output from the adding means to a normal speed signal;

wherein:
the delay means enabling delaying the signal of odd line which is output from the signal separating switch for one horizontal scanning period;
the first memory enabling temporarily storing an output from the delay means; and
the second memory enabling temporarily storing the signal of even line which is output from the signal separating switch.

7. The video camera of claims 6 which comprises
the first memory enabling storing one frame of the odd line signals of the second signal which is output from the progressive scanning CCD;
the second memory enabling storing one frame of the even line signals of second signals which are output from the progressive scanning CCD;
a first adding means for adding outputs of the first memory and the second memory;
a second adding means for adding an odd line signal and an even line signal of the first exposure signals; and
a synthesizing means for synthesizing outputs of the first adding means and the second adding means.

8. The video camera of claim 7 enabling storing outputs from the synthesizing means in the first memory and the second means and outputting the same repeatedly.

9. A video camera which, comprising a progressive scanning CCD, and a camera signal processing part for converting an output from the progressive scanning CCD to a video signal adaptive to video image display, enables enlarging dynamic range by synthesizing a first signal which is obtained by exposure during a first predetermined time and a second signal which is obtained by exposure during a second predetermined time after the exposure time of the first signal, by means of the progressive scanning CCD to enlarge luminance gradation characteristics on appearance, wherein the progressive scanning CCD enables outputting the first signal and the second signal at different timings, said video camera further comprising:
a signal separating switch for separating the first signal and the second signal which are output from the progressive scanning CCD;
a delay means for delaying an output from the signal separating switch by one horizontal scanning period;
a first memory for temporarily storing an output from the delay means;
a second memory for temporarily storing the second signal which is output from the signal separating switch;
a first scanning conversion means for converting an output from the first memory to a normal speed signal;
a second scanning conversion means for converting an output from the second memory to a normal speed signal;
a synthesizing means for synthesizing the first signal and the second signal, synchronized and having normal speeds, which are output from the first scanning conversion means and the second scanning conversion means;
wherein the signal separating switch is also for separating a signal of odd line and a signal of even line of progressive scanning signals which are output from the progressive scanning CCD enabling the outputting of progressive scanning signals;
a first adding means for adding outputs from the first memory and the second memory for two fields;
a further scanning conversion means for converting an output from the adding means to a normal speed signal;
wherein: the delay means enabling delaying the signal of odd line which is output from the signal separating switch for one horizontal scanning period; the first memory enabling temporarily storing an output from the delay means and enabling storing one frame of the odd line signals of the second signal which is output from the progressive scanning CCD; and the second memory enabling temporarily storing the signal of even line which is output from the signal separating switch and enabling storing one frame of the even line signals of second signals which are output from the progressive scanning CCD;
second adding means for adding an odd line signal and an even line signal of first exposure signals; and
wherein said synthesizing means is further for synthesizing outputs of the first adding means and the second adding means;
said video camera further comprising:
a second adding means for adding an output from the delay means and an output from the signal separating switch; and
a control means for controlling a driving method of the progressive scanning CCD; wherein
said video camera takes a function in accordance with a dynamic range enlarging mode which enlarges dynamic range, or a progressive scanning mode performing progressive scanning;
wherein said first memory and said second memory store outputs from the synthesizing means and repeatedly output the stored outputs.

10. The video camera of claim 9, which comprises:
a hand blurring detecting means for making an output from the delay means to an input signal, and detecting motion vector of this input signal; and wherein writing into said first memory and the second memory are controlled with the motion vector.

11. The video camera of claim 1 which comprises a vertical high frequency emphasizing means for extracting a vertical high frequency emphasizing component based on the first signals of at least three lines which are adjacent each other in the vertical direction.

12. The video camera of claim 11 wherein:

the second scanning conversion means functions also as a delay element which delays the first signal by one horizontal scanning period; and the first signals before and after passing through the second scanning conversion means and the first scanning conversion means, respectively are input to the vertical high frequency emphasizing means together.

13. The video camera of claim 12 wherein:

a one horizontal scanning period delay element for delaying the first signal by one horizontal scanning period is applied to the first scanning conversion means and the second scanning conversion means; and the first signals before and after passing through the one horizontal scanning period delay element are input to the vertical high frequency emphasizing means together.

14. A video camera which, comprising a progressive scanning CCD, and a camera signal processing part for converting an output from the progressive scanning CCD to a video signal adaptive to video image display, enables enlarging dynamic range by synthesizing a first signal which is obtained by exposure during a first predetermined time and a second signal which is obtained by exposure during a second predetermined time after the exposure time of the first signal, by means of the progressive scanning CCD to enlarge luminance gradation characteristics on appearance, wherein the progressive scanning CCD enables outputting the first signal and the second signal at different timings, said video camera further comprising:

a signal separating switch for separating the first signal and the second signal which are output from the progressive scanning CCD;

a delay means for delaying an output from the signal separating switch by one horizontal scanning period;

a first memory for temporarily storing an output from the delay means;

a second memory for temporarily storing the second signal which is output from the signal separating switch;

a first scanning conversion means for converting an output from the first memory to a normal speed signal;

a second scanning conversion means for converting an output from the second memory to a normal speed signal;

a synthesizing means for synthesizing the first signal and the second signal, synchronized and having normal speeds, which are output from the first scanning conversion means and the second scanning conversion means;

said video camera further comprising:

a second adding means for adding an output from the delay means and an output from the signal separating switch; and a control means for controlling a driving method of the progressive scanning CCD; wherein said video camera takes a function in accordance with a dynamic range enlarging mode which enlarges dynamic range, or a progressive scanning mode performing progressive scanning.

15. A video camera which, comprising a progressive scanning CCD, and a camera signal processing part for converting an output from the progressive scanning CCD to a video signal adaptive to video image display, enables enlarging dynamic range by synthesizing a first signal which is obtained by exposure during a first predetermined time and a second signal which is obtained by exposure during a second predetermined time after the exposure time of the first signal, by means of the progressive scanning CCD to enlarge luminance gradation characteristics on appearance, wherein the progressive scanning CCD enables outputting of the first signal and the second signal at different timings, said video camera further comprising:

a signal separating switch for separating the first signal and the second signal which are output from the progressive scanning CCD;

a delay means for delaying an output from the signal separating switch and one horizontal scanning period;

a first memory for temporarily storing an output from the delay means;

a second memory for temporarily storing the second signal which is output from the signal separating switch;

a first scanning conversion means for converting an output from the first memory to a normal speed signal;

a second scanning conversion means for converting an output from the second memory to a normal speed signal; and a synthesizing means for synthesizing the first signal and the second signal, synchronized and having normal speeds, which are output from the first scanning conversion means and the second scanning conversion means;

a signal separating switch for separating a signal of odd line and a signal of even line of progressive scanning signals which are output from the progressive scanning CCD enabling also outputting progressive scanning signals;

an adding means for adding outputs from the first memory and the second memory for two fields;

a scanning conversion means for converting an output from the adding means to a normal speed signal;

wherein:

the delay means enabling delaying the signal of odd line which is output from the signal separating switch for one horizontal scanning period;

the first memory enabling temporarily storing an output from the delay means;

the second memory enabling temporarily storing the signal of even line which is output from the signal separating switch; and said video camera further comprising:

a hand blurring detecting means for making an output from the delay means to an input signal, and detecting motion vector of this input signal; and wherein writing into the first memory and the second memory are controlled with the motion vector.

16. A video camera which, comprising a progressive scanning CCD, and a camera signal processing part for converting an output from the progressive scanning CCD to a video signal adaptive to video image display, enables enlarging dynamic range by synthesizing a first signal which is obtained by exposure during a first predetermined time and a second signal which is obtained by exposure during a second predetermined time after the exposure time of the first signal, by means of the progressive scanning CCD to enlarge luminance gradation characteristics on appearance, wherein the progressive scanning CCD enables outputting the first signal and the second signal at different timings, said video camera further comprising:

a signal separating switch for separating the first signal and the second signal which are output from the progressive scanning CCD;

a delay means for delaying an output from the signal separating switch by one horizontal scanning period;

a first memory for temporarily storing an output from the delay means;

a second memory for temporarily storing the second signal which is output from the signal separating switch;

a first scanning conversion means for converting an output from the first memory to a normal speed signal;

a second scanning conversion means for converting an output from the second memory to a normal speed signal;

a synthesizing means for synthesizing the first signal and the second signal, synchronized and having normal speeds, which are output from the first scanning conversion means and the second scanning conversion means;

wherein the signal separating switch is also for separating a signal of odd line and a signal of even line of progressive scanning signals which are output from the progressive scanning CCD enabling the outputting of progressive scanning signals;

a first adding means for adding outputs from the first memory and the second memory for two fields; a further scanning conversion means for converting an output from the adding means to a normal speed signal;

wherein:
the delay means enabling delaying the signal of odd line which is output from the signal separating switch for one horizontal scanning period;
the first memory enabling temporarily storing an output from the delay means; and
the second memory enabling temporarily storing the signal of even line which is output from the signal separating switch;

said video camera further comprising:
a second adding means for adding an output from the delay means and an output from the signal separating switch; and
a control means for controlling a driving method of the progressive scanning CCD; wherein said video camera takes a function in accordance with a dynamic range enlarging mode which enlarges dynamic range, or a progressive scanning mode performing progressive scanning.

17. The video camera of claim 6, which comprises:
a hand blurring detecting means for making an output from the delay means to an input signal, and detecting motion vector of this input signal; and wherein writing into the first memory and the second memory are controlled with the motion vector.

18. A video camera which, comprising a progressive scanning CCD, and a camera signal processing part for converting an output from the progressive scanning CCD to a video signal adaptive to video image display, enables enlarging dynamic range by synthesizing a first signal which is obtained by exposure during a first predetermined time and a second signal which is obtained by exposure during a second predetermined time after the exposure time of the first signal, by means of the progressive scanning CCD to enlarge luminance gradation characteristics on appearance, wherein the progressive scanning CCD enables outputting the first signal and the second signal at different timings, said video camera further comprising:

a signal separating switch for separating the first signal and the second signal which are output from the progressive scanning CCD;

a delay means for delaying an output from the signal separating switch by one horizontal scanning period;

a first memory for temporarily storing an output from the delay means;

a second memory for temporarily storing the second signal which is output from the signal separating switch;

a first scanning conversion means for converting an output from the first memory to a normal speed signal;

a second scanning conversion means for converting an output from the second memory to a normal speed signal;

a synthesizing means for synthesizing the first signal and the second signal, synchronized and having normal speeds, which are output from the first scanning conversion means and the second scanning conversion means;

wherein the signal separating switch is also for separating a signal of odd line and a signal of even line of progressive scanning signals which are output from the progressive scanning CCD enabling the outputting of progressive scanning signals;

a first adding means for adding outputs from the first memory and the second memory for two fields;

a further scanning conversion means for converting an output from the adding means to a normal speed signal;

wherein: the delay means enabling delaying the signal of odd line which is output from the signal separating switch for one horizontal scanning period; the first memory enabling temporarily storing an output from the delay means and enabling storing one frame of the odd line signals of the second signal which is output from the progressive scanning CCD; and the second memory enabling temporarily storing the signal of even line which is output from the signal separating switch and enabling storing one frame of the even line signals of second signals which are output from the progressive scanning CCD;

second means for adding an odd line signal and an even line signal of first exposure signals; and wherein said synthesizing means is further for synthesizing outputs of the first adding means and the second adding means;

said video camera further comprising:
a second adding means for adding an output from the delay means and an output from the signal separating switch; and
a control means for controlling a driving method of the progressive scanning CCD; wherein said video camera takes a function in accordance with a dynamic range enlarging mode which enlarges dynamic range, or a progressive scanning mode performing progressive scanning.

19. The video camera of claim 7, which comprises:
a hand blurring detecting means for making an output from the delay means to an input signal, and detecting motion vector of this input signal; and wherein writing into the first memory and the second memory are controlled with the motion vector.

20. The video camera of claim 8, which comprises:

a hand blurring detecting means for making an output from the delay means to an input signal, and detecting motion vector of this input signal; and wherein writing into the first memory and the second memory are controlled with the motion vector.

21. A video camera which enables enlarging dynamic range by synthesizing a first signal which is obtained by exposure during a first predetermined time and a second signal which is obtained by exposure during a predetermined time after the exposure time of the first signal, said video camera comprising:

a progressive scanning CCD operable to obtain and output the first and second signals;

a CCD driver operable to drive said CCD according to a progressive scanning method;

a camera signal processor;

a separating circuit operable to separate the first signal and the second signal output from said progressive scanning CCD;

a delay operable to receive the first signal from said separating circuit and to delay the first signal by a predetermined time such that the second signal and the first signal are simultaneously input to said signal synthesizer;

a first scanning converter operable to perform scanning conversion such that the first signal of one line of said CCD is output for a time corresponding to one horizontal scanning period;

a second scanning converter operable to perform scanning conversion such that the second signal of said one line of said CCD is output for a time corresponding to one horizontal scanning period;

a signal synthesizer operable to synthesize the first signal and the second signal output from said first and second scanning converters to produce a synthesized signal;

a signal adder operable to add the first signal of said one line of said CCD and the first signal of a vertically adjacent line of said CCD; and a switch operable to select a signal output from said signal synthesizer or a signal output from said signal adder in accordance with the progressive scanning method of said CCD and to output the selected signal to said camera signal processor.

22. The video camera of claim 21, wherein:

said first scanning converter is further operable to delay the first signal by one horizontal scanning period; and said signal adder is operable to add the output of said first scanning converter and the first signal, which is also the input to said first scanning converter.

23. The video camera of claim 21, further comprising:

a vertical high frequency emphasizer operable to extract a vertical high frequency emphasizing component based on the first signals of at leas three vertically adjacent lines of said CCD.

24. The video camera of claim 23, wherein:

said second scanning converter is further operable to delay the first signal by one horizontal scanning period; and the first signals before and after passing through the second scanning converter and the first scanning converter, respectively, are input to the vertical high frequency emphasizer.

25. The video camera of claim 24, further comprising:

a horizontal scanning period delay element operable to delay the first signal by one horizontal scanning period applied to the first scanning converter and the second scanning converter;

wherein the first signals before and after passing through the one horizontal scanning period delay element are input to said vertical high frequency emphasizer.

26. A video camera which enables enlarging dynamic range by synthesizing a first signal which is obtained by exposure during a first predetermined time and a second signal which is obtained by exposure during a predetermined time after the exposure time of the first signal, said video camera comprising:

a progressive scanning CCD operable to obtain the first and second signals and to output the first and second signals at different timings, and operable to output odd line and even line progressive scanning signals;

a camera signal processor;

a signal separating switch operable to separate the first signal and the second signal output from said CCD, and operable to separate the odd line and even line signals output from said CCD;

a delay operable to delay an output from said signal separating switch by one horizontal scanning period, and operable to delay the odd line signal output from said signal separating switch for one horizontal scanning period;

a first memory operable to temporarily store an output of said delay;

a second memory operable to temporarily store the second signal output from said signal separating switch, and operable to temporarily store the even line signal output from said signal separating switch;

a adder operable to add the output from said first memory and the output from said second memory for two fields;

a first scanning converter operable to convert an output from said first memory to a normal speed signal;

a second scanning converter operable to convert an output from said second memory to a normal speed signal, and operable to convert an output from said adder to a normal speed signal;

a synthesizer operable to synthesize the first signal and the second signal, synchronized and having normal speeds, output from said first and second scanning converters.

* * * * *